United States Patent
DeHaven et al.

(10) Patent No.: US 8,935,604 B2
(45) Date of Patent: Jan. 13, 2015

(54) METHOD AND SYSTEM FOR DISTRIBUTION OF CONTENT USING A SYNDICATION DELAY

(75) Inventors: Michael Lee DeHaven, Cedar Park, TX (US); David Alan Gee, Austin, TX (US); Subbalakshmi Iyer, Austin, TX (US)

(73) Assignee: Bazaarvoice, Inc., Austin, TX (US)

(*) Notice: Subject to any disclaimer, the term of this patent is extended or adjusted under 35 U.S.C. 154(b) by 12 days.

(21) Appl. No.: 13/289,724

(22) Filed: Nov. 4, 2011

(65) Prior Publication Data

US 2012/0117459 A1     May 10, 2012

Related U.S. Application Data

(60) Provisional application No. 61/456,348, filed on Nov. 5, 2010, provisional application No. 61/416,840, filed on Nov. 24, 2010.

(51) Int. Cl.
     *G06F 17/00*     (2006.01)
     *G06F 3/12*     (2006.01)
     (Continued)

(52) U.S. Cl.
     CPC .......... *G06F 3/1256* (2013.01); *G06Q 30/0217* (2013.01); *G06Q 30/0278* (2013.01);
     (Continued)

(58) Field of Classification Search
     CPC ............. G06F 3/1256; G06Q 30/0217; G06Q 3/0214; G06Q 30/0278; G06Q 30/0281
     USPC .................. 715/234, 760, 229, 862; 717/168; 729/9; 726/9; 705/319, 14.53, 26.1
     See application file for complete search history.

(56) References Cited

U.S. PATENT DOCUMENTS 5,528,490 A    6/1996    Hill
5,761,649 A    6/1998    Hill
(Continued)

FOREIGN PATENT DOCUMENTS

WO    WO 2007047691    4/2007
WO    WO 2007050234    5/2007
WO    WO 2007059096    5/2007

OTHER PUBLICATIONS

"You're It," a blog on tagging at http://www.tagsonomy.com/, printed Dec. 12, 2007, 13 pgs.

(Continued)

*Primary Examiner* — Quoc A Tran
(74) *Attorney, Agent, or Firm* — Meyertons, Hood, Kivlin, Kowert & Goetzel, P.C.

(57) ABSTRACT

Embodiments of methods and systems for incorporating user generated content into a web page are disclosed. In particular, embodiments of such systems and methods may incorporate user generated content into a web page such that the user generated content can be consumed by indexers associated with search engines in association with that web page. Additionally, embodiments may also provide a mechanism by which user generated content may be received and included in a web page when that web page is rendered. Using embodiments as disclosed herein user generated content may be exposed to a search engine indexer in a web page while still providing a mechanism for incorporating the freshest user generated content in such a web page. Embodiments may also improve the ability of search engines or search engine indexers to determine the site of origin for such user content.

21 Claims, 11 Drawing Sheets

(51) Int. Cl.
*G06F 17/30* (2006.01)
*G06Q 30/02* (2012.01)

(52) U.S. Cl.
CPC ...... *G06Q30/0214* (2013.01); *G06F 17/30864* (2013.01); *G06F 17/3089* (2013.01); *G06Q 30/0281* (2013.01)
USPC ........... 715/234; 715/760; 715/229; 715/862; 717/168; 726/9; 705/319; 705/14.53; 705/26.1

(56) References Cited

U.S. PATENT DOCUMENTS

| | | | |
|---|---|---|---|
| 5,999,908 | A | 12/1999 | Abelow |
| 6,029,142 | A | 2/2000 | Hill |
| 6,236,994 | B1 | 5/2001 | Swartz et al. |
| 6,757,682 | B1 | 6/2004 | Naimark et al. |
| 6,785,671 | B1 | 8/2004 | Bailey et al. |
| 6,999,962 | B2 | 2/2006 | Julliard et al. |
| 7,133,834 | B1 | 11/2006 | Abelow |
| 7,143,089 | B2 | 11/2006 | Petras et al. |
| 7,222,078 | B2 | 5/2007 | Abelow |
| 7,428,496 | B1 | 9/2008 | Keller et al. |
| 7,428,505 | B1 | 9/2008 | Levy et al. |
| 7,620,565 | B2 | 11/2009 | Abelow |
| 7,620,651 | B2 | 11/2009 | Chea et al. |
| 7,908,173 | B1 | 3/2011 | Hill |
| 7,908,176 | B1 | 3/2011 | Hill |
| 7,930,363 | B2 | 4/2011 | Chea et al. |
| 7,937,391 | B2 | 5/2011 | Chea et al. |
| 8,341,026 | B1 * | 12/2012 | Mirchandani et al. ........ 705/26.1 |
| 2002/0019763 | A1 | 2/2002 | Linden et al. |
| 2002/0112035 | A1 | 8/2002 | Carey et al. |
| 2002/0165905 | A1 | 11/2002 | Wilson |
| 2004/0030697 | A1 | 2/2004 | Cochran et al. |
| 2005/0044197 | A1 | 2/2005 | Lai |
| 2006/0069564 | A1 | 3/2006 | Allison et al. |
| 2007/0078833 | A1 | 4/2007 | Chea et al. |
| 2007/0112760 | A1 | 5/2007 | Chea et al. |
| 2007/0169096 | A1 | 7/2007 | Chea et al. |
| 2007/0174247 | A1 | 7/2007 | Xu et al. |
| 2007/0192155 | A1 | 8/2007 | Gauger |
| 2007/0244888 | A1 | 10/2007 | Chea et al. |
| 2008/0109232 | A1 | 5/2008 | Musgrove et al. |
| 2008/0195480 | A1 | 8/2008 | Calabria |
| 2008/0244431 | A1 | 10/2008 | Chea et al. |
| 2009/0037412 | A1 | 2/2009 | Bard et al. |
| 2009/0299824 | A1 * | 12/2009 | Barnes, Jr. ...................... 705/10 |
| 2009/0320119 | A1 | 12/2009 | Hicks et al. |
| 2010/0114883 | A1 | 5/2010 | Chea et al. |
| 2011/0264737 | A1 | 10/2011 | Skinner |
| 2011/0320422 | A1 | 12/2011 | Denenberg et al. |
| 2012/0124463 | A1 | 5/2012 | DeHaven et al. |
| 2012/0158735 | A1 * | 6/2012 | Ruhl et al. .................... 707/741 |
| 2012/0310747 | A1 * | 12/2012 | Calabria ..................... 705/14.67 |
| 2014/0237098 | A1 | 8/2014 | Dasilva et al. |

OTHER PUBLICATIONS

Arrington, Michael "Profile: DinnerBuzz," Jun. 2005, 4 pgs., at http:///www.techcrunch.com/2005/07/03/profile-dinnerbuzz/, printed on Dec. 12, 2007.

AdamNation tagging blog posted on Jul. 28, 2005 at http://adam.easyjournal.com/entry.aspx?eid=2632426 printed on Dec. 12, 2007, 5 pgs.

PeerPressure >> Scrumptious blog, dated Mar. 22, 2005, at http://www.allpeers.com/blog/?page_id=71, printed Dec. 12, 2007, 19 pgs.

Golder, Scott A. and Huberman, Bernardo A., "The Structure of Collaborative Tagging Systems," Information Dynamics Lab, HP Labs, Aug. 18, 2005, 8 pgs.

Arrington, Michael, Amazon Tags, Nov. 14, 2005, at http://www.techcrunch.com/2005/11/14/amazon-tags/, printed Dec. 12, 2007, 7 pgs.

Ugoretz, Joseph, "Three Stars and a Chili Pepper: Social Software, Folksonomy, and User Reviews in the College Context," Academic Commons, Jun. 9, 2006, at http://www.academiccommons.org/commons/essagy/Ugoretz-social-software-folksonomy, printed Dec. 12, 2007, 5 pgs.

Beach, David and Gupta, Vivek, Yahoo! Search Blog: Social Commerce via the Shoposphere & Pick Lists, Nov. 14, 2005, at http://www.ysearchblog.com/archives/000214.html, printed Dec. 12, 2007, 4 pgs.

Kroski, Ellyssa, "The Hive Mind: Folksonomies and User-Based Tagging," Dec. 7, 2005, at http://infotangle.blogsome/2005/12/07/the-hive-mind-folksonomies-and-user-based-tagging/, printed Dec. 12, 2007, 15 pgs.

Xu Zhichen, Yun Fu, Jianchang Mao and Difu Su, "Towards the Semantic Web: Collaborative Tag Suggestions," Yahoo! Inc., Santa Clara, CA, 8 pgs., in WWW2006: Proceedings of the Collaborative Web Tagging Workshop, 2006.

International Search Report and Written Opinion of the International Searching Authority for International Patent Application No. PCT/US2011/059395, mailed Apr. 3, 2012, 8 pgs.

Harry, David, "How Content Syndication Can Backfire," in the Fire Horse Trail (online), Jun. 7, 2010, retrieved on Mar. 8, 2012 at http://www.huomah.com/Search-Engines/Search-Engine-Optimization/How-Content-Syndication-Can-Backfire.html, p. 2, para 1-3, 9 pgs.

Office Action in U.S. Appl. No. 13/289,586 issued Jan. 30, 2013, 17 pages.

International Preliminary Report in Application No. PCT/US2011/059395 mailed May 16, 2013, 7 pages.

Office Action in U.S. Appl. No. 13/289,586 issued Sep. 10, 2013, 16 pages.

Office Action in U.S. Appl. No. 13/289,586 mailed Oct. 16, 2014, 20 pages.

* cited by examiner

FIG. 6A

Rosetta Stone® Reviews http://www.rosettastone.com/reviews/Italian/Level-1-2-3-4-5    link:http://www.fluentin3months.com    1.800.767.3882 osettaStone

ROSETTA STONE RATINGS AND REVIEWS

Rosetta Stone Italian
Level 1, 2, 3, 4 & 5 Set Reviews (67 reviews)

The Complete Italian set will enable you to fully express your ideas and opinions in Italian and master the conversational skills required to plan adventures, care for your health, and move abroad.

[LEARN MORE]

Italian Level 1, 2, 3, 4 Ramp; 5 4 7 5 67 67
Great Product! I bought this course knowing no Italian. Now after 3 months and having finished the course I can easily say that I speak Italian. It may not be fluent but I can communicate very well and understand, almost perfectly. Even though I do know 3 other Romance Languages (which probably helped me a lot) I think that anyone who bought this product and dedicated themselves to it, will have a wide knowledge and communicative skills by the end of the course. October 3, 2011.
4.5 stars. Maybe this is because I've already had experience with a Romance Language, but this program was excellent in helping me learn Italian. Though I've been using this program for less than a year I can already communicate in Italian (nearly) the same breadth of topics as I can my second language, Spanish. Though tedious at times, the repetition really helps me to become effective at memorizing the words and what they mean. I was reading through some Italian textbooks the other day and found I could understand the material in the lessons when I've never even used such materials. I'm just starting with Unit 4 and am already so impressed with the amount of information I'm learning. Once I finish with all of the lessons I'm going to review all of the stories and play all of the games until the language moves like butter through my mind. To attain fluency, however, I'm going to have to try different methods for memorizing mass amounts of words and concepts. However, I enthusiastically recommend this program to any desiring to learn the language. It is without a doubt the best purchase I've ever made. July 13, 2011.
Good but not perfect. Rosetta Stone is a very good product but one that needs much improvement. You cannot rely on this software to be the only source for learning Italian. You will need other materials, (books or software), to assist you. On the plus side, Rosetta Stone is effective in building word association. If you can look at a cat and think "Gatto" then you know that you've learned something that will stick with you. The more you build your

[SELECT A LANGUAGE]

[SELECT A LEVEL]

Try Our Free Online Demo

[GET STARTED]

Shop Now At Rosetta Stone
Learn more about Rosetta Stone
Italian
Choose from more than 30 languag es spoken in 150 countries

[SHOP NOW]

[JOIN THE CONVERSATION]

FIG. 6B

METHOD AND SYSTEM FOR DISTRIBUTION OF CONTENT USING A SYNDICATION DELAY

RELATED APPLICATIONS

This application claims a benefit of priority under 35 U.S.C. §119 to Provisional Patent Application No. 61/456,348 entitled "Method and System for Including Content on Web Sites" by Michael Lee DeHaven, et al., filed Nov. 5, 2010, and U.S. Provisional Patent Application No. 61/416,840 entitled "Method and System for Distribution of User Generated Content Using a Syndication Delay" by Michael Lee DeHaven, et al., filed Nov. 24, 2010, both of which are fully incorporated herein by reference in their entirety.

TECHNICAL FIELD

This disclosure relates generally to the collection and distribution of content. In particular, this disclosure relates to the distribution of content included in a web page. Even more specifically, this disclosure relates to the distribution of user-generated content included in a web page in a manner compatible with the functionality of certain search engines and search engine indexers.

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially ratings and reviews, but also general information. In the context of advertising and marketing, the use of word of mouth may mean passing information between consumers or other entities, including manufacturers, experts, retailers, etc. to convey aspects or merits of a product or service, or the experience one person has related to that product or service, or related products or services.

The emergence of the importance of word of mouth marketing and advertising has coincided with the use of the Internet for researching, shopping and purchasing of products. Thus, online marketing and advertising has also become increasingly important. The use of word of mouth marketing in an online setting may therefore be an effective method for such online advertising, as consumer recommendations allow word of mouth advertising to be disseminated either online or offline.

In fact, according to a 2007 global Nielsen survey, consumer recommendations are the most credible form of advertising, as cited by 78% of the study's respondents. When businesses enable customers, or other types of users, to write reviews, ask or answer questions from the community, or share experiences, they create content that become powerful forms of marketing, and in particular, as discussed above, word of mouth marketing.

This view has been widely reinforced by many operators of web sites including, for example, retailers (retailers will be used herein to refer to any type of seller, manufacturer, or any other entity involved in the lifecycle of a product or service, for example both online and brick and mortar) who report that products with relatively more reviews sell better and are returned less often.

Thus, it is desirable that such user generated content be exposed in a manner that such user generated content is consumed in association with the web page on which such user generated content is included.

SUMMARY

As discussed, user-generated content (comprising any information such as text, audio, video, or other information carrying medium generated by a user who is a consumer (of goods, a product, website, service, purchaser of the product, etc.)) may be extremely important to manufacturers, retailers or other sellers of a product or service (collectively referred to herein as a product) as user-generated content may allow products to be differentiated and sales of products increased. This user-generated content may include such things as user reviews, user stories, ratings, comments, problems, issues, question/answers, or other type of content which, for example, a user is allowed to compose or submit through any medium.

In many cases, operators of web sites that comprise web pages with such user generated content may desire to expose such web pages through web based search engines (e.g. Google, Bing, Yahoo, etc.). Such search engines may utilize a search engine indexer (also referred to as a web crawler, ant, automatic indexer or indexer, bot, web spider or spider, web scutter, etc.) to navigate through web pages on the internet to index information associated with the web pages through algorithmic analysis of such information. Using the created indices then, links to a set of web pages may be presented to a user as a result of a search comprising one or more terms. The links may be presented in order according to a ranking based on information in the indices.

The user generated content included in retailer's or manufacturer's web sites, as discussed above, may include a variety of content (e.g. terms, etc.) that would be indexed by a search engine indexer and that could result in a particular web page that includes such user generated content receiving a higher ranking and thus being exposed as a result of a search or being more highly ranked and thus exposed, for example, on a first page of search results, etc.

Thus, it is desirable that such user generated content be exposed to search engine indexers in a manner that such user generated content is indexed in association with the web page on which such user generated content is included. Accordingly, methods and systems for incorporating user generated content into a web page are disclosed. In particular, embodiments of such systems and methods may incorporate user generated content into a web page such that the user generated content can be consumed by indexers associated with search engines in association with that web page. Additionally, embodiments may also provide a mechanism by which user generated content may be received and included in a web page when that web page is rendered.

As can be seen then, using embodiments presented herein user generated content may be exposed to a search engine indexer in a web page while still providing a mechanism for incorporating the freshest user generated content using an architecture that can provide for substantially real time interactivity between a user and aspects of user generated content through a web page. Furthermore, embodiments may the advantage of allowing a web page or web site to provide substantially similar user experiences regardless of the configuration of a user's browser (e.g. whether JavaScript is enabled or not).

As significant effort and expense has been invested in the gathering and dissemination of such user generated content, and this user generated content may have a profound effect on how the web pages which incorporate such user generated content are exposed through a search engine, it may be highly desired by the operators of web sites which utilize content from a content distribution system that such user generated content be indexed in conjunction with the web page(s) of their site by search engine indexers.

Many search engine operators understand that user generated content may be generated at one site and displayed at one or more other sites (this is sometimes referred to as syndication of content). The algorithms used by these search engines to index web pages may thus attempt to give more weight to content in conjunction with the site of origin. Accordingly, in many cases, operators of web sites where content was originated desire for this to be taken into account when search engines index or rank the web pages in their site. However, in some cases it may be difficult for search engines or search engine indexers to determine the site of origin for various content, including user generated content. It is therefore desired to provide systems and methods which allow syndication of content while improving the ability of search engines or search engine indexers to more easily determine the domain of origin for such content.

To that end, embodiments of the methods and systems for incorporating user generated content into a web page may implement a syndication delay. In particular, to allow easy determination of the site of origin of such user generated content there may be a delay imposed between the reception of content and the syndication of this content to web sites other than the web site where the content was originally generated. In other embodiments, a syndication delay time period may be designated by a site other than a site of origin. Here, user generated content may not be syndicated to that site if it was generated within the syndication delay time period associated with that site.

In one particular embodiment, first user generated content generated at a first web page of a first web site and associated with a product or a category is received at a content distribution system and may be subsequently distributed to a second web site. If the first web site is the same as a second web site, the first user-generated content may be provided from the content distribution system to a second web site and incorporated into the source code of a second web page of the second web site associated with the product or category. If the first web site is not the same as the second web site a syndication delay time period associated with the first web site is determined and if the first user generated content was not generated within the syndication delay time period, the first user-generated content may be provided from the content distribution system to the second web site and incorporated into the source code of a second web page of the second web site associated with the product or category.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 6A and 6B are examples of rendered web pages.

DETAILED DESCRIPTION

Figure 1:
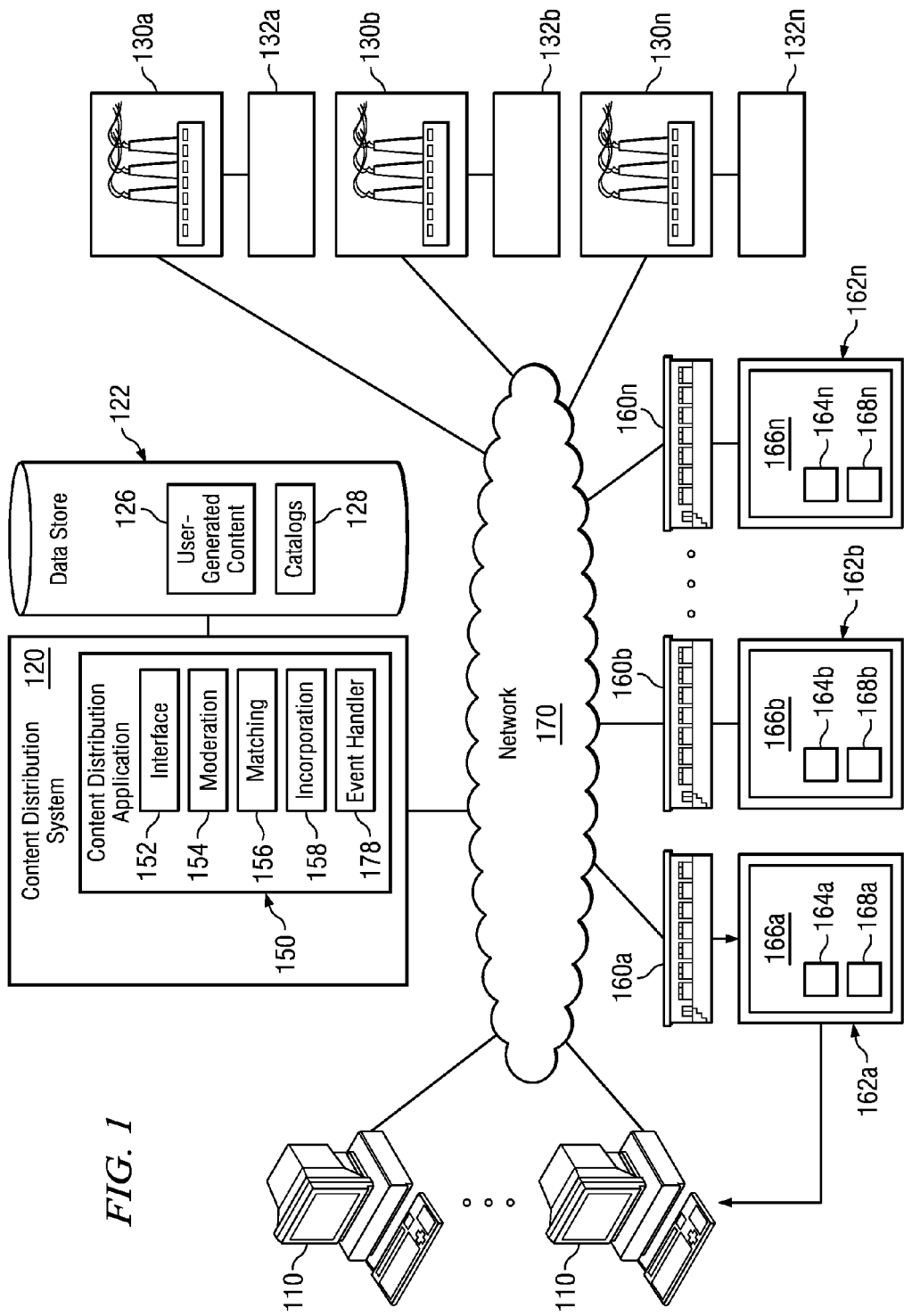
FIG. 1 is a block diagram of one embodiment of an architecture in which a content distribution system may be utilized.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Language designating such nonlimiting examples and illustrations includes, but is not limited to: "for example," "for instance," "e.g.," "in one embodiment."

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing specific embodiments a brief overview of the context of the disclosure may be helpful. As discussed above it is desirable that user generated content be exposed to search engine indexers in a manner that such user generated content is indexed in association with the web page on which such user generated content is included.

One embodiment of exposing such user generated content to search engines indexers in association with a web page is to incorporate the content directly into the web page, such that the source code of the web page itself comprises the user generated content (e.g. for example, the HTML of the web page comprises the user generated content that is to be displayed on the web page itself). In this manner, when the source code of the web page is indexed by a search engine indexer the user generated content is processed by the search engine indexer in conjunction with the processing of the source code of the web page.

However, utilizing only this method of incorporating user generated content into a web page is less than desirable for a variety of reasons, including that the user generated content that is exposed may be static in nature and thus may be stale at the time of exposure. Thus, it is desired to incorporate such user generated content into a web page in a manner that the user generated content is exposed to a search engine indexer while still allowing freshness of the incorporated user generated content to be maintained.

As discussed above the generation, distribution and use of user-generated content is increasingly important in the modern marketplace. User-generated content may include content generated or found on a web site (such as a manufacturer's site or other retailer's site) and presented user-generated content may be seamlessly integrated, so the consumer cannot tell whether the reviews came from the manufacturer or another web site. Alternatively, this integrated content may be identifiable by the consumer as being sourced from the manufacturer or other retailer or the content may be segregated and clearly denoted as being sourced from the manufacturer or retailer.

One example of user-generated content is what is referred to as question/answer content. This type of content may actually be generated by two (possibly distinct) users, a first user who generates a question to which he wishes to obtain the answer and one or more second users who generate an answer to this question. The question and the corresponding answers may be displayed to users which may help to drive increased sales of a product or increased traffic at a retailers or manufacturer's site.

Another example of user-generated of content is a review. A review may comprise a body in which the user may be allowed to give, for example, a free form text evaluation of a product, category, brand, etc.; a rating for the product or aspects of the product (four out five stars, 7 out of 10, etc.); pros or cons of the product; a descriptor such as a category or keyword to be associated with the product or other information. These reviews may be displayed to users in conjunction with a product, category, brand, etc. to aid in a user's purchasing decision with respect to a product.

If consumers can find a wider variety of reviews or other types of user-generated content at their favorite retailer site they may be enabled to research and buy in one place. As a result, consumers may not have to rely on a salesperson at a store to provide information. They can read about tests conducted by expert reviewers, get product specifics from the manufacturer, ask experts or product owners questions, and get reviews and real-world experiences from consumers like them.

Thus, user-generated content helps increase the overall attention and content a subject (for example, a manufacturer's product) can get online and offline and may provide the advantage of improving retailer sales by increasing online and in-store awareness of the manufacturer's products, driving sales (which may cost the retailer nothing). Manufacturers are able to differentiate their products, and create a link to consumers at the same time.

Furthermore, manufacturers that provide user-generated content may be able to generate more "shelf space" on online retailer sites, allowing customers to differentiate products in the midst of competitive products. This allows manufacturers to increase overall product information without generating it themselves. Additionally, by distributing such user-generated content manufacturers can increase overall content volume, such as number of reviews or other types of content, therefore increasing the chances that its products will be chosen by shoppers who are interested in hearing the opinions and experiences, or obtaining assistance, from other users familiar with the product.

As can be seen then, both manufacturers and other retailers may desire to produce or include user-generated content on their sites. A manufacturer may, however, have a variety of channels where products are sold, making it difficult to gather such data. Similarly, even if the manufacturer is aware of each of the retailers selling its products, each of the retailers may have, for example, a different structure or layout for a site or different identifiers of for the same product. This means that it may be difficult to locate and collect data pertaining to their products, to process such data or to distribute such user-generated content.

Accordingly, embodiments of system and methods for the distribution of user-generated content have been developed. Certain of these embodiments may be better understood with reference to U.S. patent application Ser. No. 12/243,679 entitled "Method and System for Distribution of User Generated Content" by inventors Bockius et al. filed Oct. 1, 2008; U.S. patent application Ser. No. 12/614,016 entitled "Method and System for Promoting User Generation of Content" by inventors Chen et al. filed Nov. 6, 2009, and U.S. patent application Ser. No. 12/698,447 entitled "Method and System for Providing Content Generation Capabilities" by Chen et al. filed Feb. 2, 2010, which are all fully incorporated herein by reference.

Specifically, embodiments of the present invention may allow content to be generated by a user at a web site (for example, a manufacturer's or other retailer's site (or another site altogether)) with respect to an associated subject (for example, a product, brand, category, service, account, etc.) This content may then be distributed to one or more retailers who sell or are otherwise associated with that subject such that the user generated content may be incorporated into the retailer's site in conjunction with that subject to allow consumers shopping at that retailer to access or view such user generated content.

More particularly, in one embodiment, users may generate and submit content on a web site (for example, a manufacturer's or retailer's site) using one or more content generation tools incorporated in a retailer's, manufacturer's, or other's site (for example, these other web sites may include a content generation tool where a user may create content and may be distinct from the retailer's or manufacturer's site). This user generated content may be received at a content distribution system and user-generated content associated with a particular product, category, brand, etc. may then be distributed to one or more retailers who sell this product, category, brand, etc. such that this content may be incorporated into the retailer's site in association with that product, category, brand, etc.

As significant effort and expense has been invested in the gathering and dissemination of such user generated content and this user generated content may have a profound effect on how the web pages which incorporate such user generated content are exposed through a search engine it is highly desired by the operators of web sites which utilize content from a content distribution system that such user generated content be indexed in conjunction with the web page(s) of their site by search engine indexers. These search engine indexers may utilize such criteria as content richness (keyword density), freshness (recency) of content included on web page, Query Deserves Freshness (QDF), etc.

In some cases, however, the manner in which such user generated content is incorporated into web pages may affect the indexing of that content. In particular, the manner by which user generated content from a centralized content distribution system is incorporated into a web page may impede the indexing of such user generated content in conjunction with the web page in which it is exposed. Thus, it is desirable that such user generated content be exposed to search engine indexers in a manner that such user generated content is indexed in association with the web page on which such user generated content is included.

To that end, attention is now directed to methods and systems for incorporating user generated content into a web page. In particular, embodiments of such systems and methods may incorporate user generated content into a web page such that the user generated content can be consumed by indexers associated with search engines in association with that web page. In this manner the web page which incorporates such content may be more highly ranked by these search engines with respect to, for example, one or more key words.

Turning now to FIG. 1, one embodiment of a content distribution topology including one embodiment of a content distribution system is depicted. Manufacturers 130 may produce, wholesale, distribute or otherwise be affiliated with the manufacturer or distribution of one or more products. Retailers 160 may be sales outlets for products made by one or more of manufacturers 130. In fact, in most cases each retailer 160 will sell products from multiple manufacturers 130. These products may be provided for sale in conjunction with one or more web sites (referred to also as sites) 162 (or brick and mortar stores) provided by each of retailers 160 such that users at computing devices 110 may access a web site system (e.g. one or more computing device, which may for example, include one or more web servers) providing the retailer's site 162 over network 170 (for example, the Internet or another type of communications network) in order to purchase these products or perform other actions.

In addition to offering the ability to purchase these products, retailer's site 162 may offer the ability for a user to access user generated content associated with certain subjects such as products, categories of products, brands, etc. offered for sale on the retailer's site 162. By accessing such user generated content at the retailer's site 162 a user may be better able to make a purchasing decision with respect to the various products offered for sale on that retailer's site 162 or may be more inclined to buy a product, as the user feels that the product has received positive user generated content (reviews, ratings, questions/answers, etc.) from a critical mass of other users, etc. A user may thus purchase a manufacturer's product from a retailer 160 using retailer's site 162.

Retailer site 162 may also offer the ability for a user to generate content with respect to products offered for sale by retailer 160 (or other products). In other words, a user may utilize the retailer's site 162 to generate user reviews, ratings, comments, problems, issues, question/answers, or almost any other type of content regarding a product or experience with the product, brand, manufacturer or retailer, where this user-generated content may be displayed to other users accessing retailer's site 162.

It will be apparent, however, that there may be many other ways to purchase or obtain such a product. The product may be offered for sale at many physical stores which may or may not have an online presence (for example, a site), at other retailer's sites 162, the product may be purchased second hand, received as a gift, etc. At some point then the person who obtained this product may desire to provide some sort of feedback on this product and for a variety of reasons, such a purchaser may not have access to, or may not desire to utilize, retailer's site 162 to generate content in association with the obtained product.

To allow these types of people, among other types, to provide user-generated content with respect to a particular product, manufacturer's site 132 or retailer's site 162 can provide the ability for a user to generate content with respect to the manufacturer's products. In other words, a user may use the manufacturer's site 132, retailer's site 162 or these other means, to generate user reviews, ratings, comments, problems, issues, question/answers, or almost any other type of content regarding a product, brand or manufacturer, usually regardless of where the user purchased the manufacturer's product.

In one embodiment, the user generated content which may be generated at a retailer's site 162 or manufacturer's site 132 may include reviews, stories, question/answer content or any other type of content in any format which the user wishes to add regarding a product, category of products, brand or service (collectively referred to as a product herein). Reviews may correspond to a user evaluation of a product and include ratings of product (for example, a number of stars or numerical rating), pros and cons of the product, a descriptive title and a description of a user's experience with a product (referred to as the body of the review), attributes of the user generating the review (for example, demographic information), other product(s) which compliment or may be used with the product being reviewed, pros and cons of the product or any other type of evaluation of a product or aspects of a user's experience with the product. Ask/Answer content may comprise questions or answers submitted by a user, retailer or manufacturer concerning a potential purchase decision, for example regarding the capabilities or use of a product or category of products, demographic information on a user generating a question or answer. Stories may be user generated content which may pertain to open ended experiences with one or more products or categories of products which may be more tangentially related to the product than, for example, reviews.

As the amount of user-generated content associated with a product at a retailer's site 162 may greatly affect the sale of that product (both at that site 162 and off-line purchases as well), it may be desirable to both manufacturers 130 of a product and retailers 160 who sell that product that any user-generated content created in association with that product be displayed in conjunction with that product on a retailer's site 162 (which may increase revenue for both a retailer 160 and a manufacturer 130 of the product).

Content distribution system 120 may therefore be coupled to network 170 and serve to distribute content generated at retailer's site 132, manufacturer's site 162, or another location, to retailers' sites 162 which offers these products or categories of products for sale such that the content generated by a user with respect to that product or category at the retailer's site 162 and the manufacturer's site 132 is incorporated into that retailer's sites 162 where the product, or category of product, is offered. Thus, content distribution system 120 allows content generated at a particular retailer's site 162 to be combined with content generated at the manufacturer's site 132 (or another site) and incorporated into that retailer's site 162 in conjunction with that product, category, brand, etc. Additionally, content distribution system 120 allows content to be distributed to many retailers 160.

By centralizing the distribution, incorporation and analysis of this user generated content a number of technical advantages may be achieved, especially with regards to the processing (including analysis), storage and distribution of such user generated content, including the moderation of such user generated content and the formatting of such user generated content for incorporation in the sites 162 of retailers 160. Additionally, this centralization may allow for easier correlation of user generated content with manufacturers, products or categories; statistical analysis of such user generated content and the presentation of such statistical data to the manufacturers.

Furthermore, such a centralized distribution system may have a number of business advantages. For example, as the sale of their products is important to manufacturers 130, these manufacturers 130 may pay operators of content distribution system 120 for formatting or distributing the content to the retailer's sites 162. This is in contrast to the usual payment flows where the retailer 160 gets paid for displaying advertising, or content aggregators getting paid by portals who display the data and who in turn charge manufacturers 130 for lead generation. Similarly, since the incorporation of user-generated content may also drive off-line purchases (after reading reviews at a site 162 a potential purchaser may drive to a physical store to make a purchase of that good) payment may be made by a manufacturer 130 or retailer 160 irrespective of where the product was purchased (for example, on-line versus off-line purchases).

As discussed above, it may be desired by operators of manufacturer's site 132 or retailer's site 162 that the incorporated user generated content be exposed to indexers for search engines in conjunction with the web page on which it is included. In many cases the methodology utilized to incorporate content from content distribution system 120 into a retailer's site 162 may make exposure of such content to these search engine indexers difficult.

Specifically, in some cases, the content from content distribution system 120 may be incorporated into an area of a web page of retailer's site 162 using a <div> tag (or another type of HTML element or tag (e.g. an <iframe>), or another type of mechanism) which works in conjunction with a software application associated with content distribution system 120 (such as JavaScript or other set of computer readable instructions) included on the web page or at the computing devices providing retailer's site 162 that is used to make calls back to the content distribution system 120 to incorporate the desired content for that page.

In certain embodiments then, when a web page of retailer's site 162 is loaded on a browser at a user's computer 110 the web page includes a script or other mechanism (e.g. JavaScript or asynchronous JavaScript and XML (AJAX), ActiveX, etc.) by which a request for user generated content for the web page is made to the content distribution system 120. In response to the request, the content distribution system 120 may return appropriate content (including user generated content) to the user's computer 110 for incorporation into the rendered web page.

As the user generated content to be displayed on the web page of the retailer's site 162 is actually provided by content distribution system 120 (or from any other source) in response to a request caused by execution of a software application during the rendering of the page by the browser it may not be exposed to a search engine indexer when such a search engine indexer accesses the web page. This is because these search engine indexers may not have the ability to index user generated content included based on a response to the request as the content may be included in such a manner that it is invisible to such search engine indexers because, for example it may be created at the content distribution system 120 and included in a container on the web page loaded at the user's computer 110 using JavaScript, AJAX or the like, or such search engine indexers may not execute software applications such as JavaScript in an accessed web page.

Thus, as discussed above, it is desired to provide such content on a web page in a manner which will allow such content to be indexed by search engine indexers. Part and parcel with this desire however, is the potentially competing desire to present the freshest content in conjunction with each access to a particular web page. Embodiments as presented herein may reconcile this potential conflict and allow both of these desires to be met. Before continuing, however, it will be helpful here to discuss content distribution system 120 in more detail.

Content distribution system 120 may include one or more computers communicatively coupled to a network 170 and a data store 122. Data store 122 may comprise user generated content 126 and catalogs 128. User generated content 168 may be associated with one or more products or categories, where this user generated content may have been generated at manufacturer's site 132, retailer's site 162 or at another location altogether. Catalogs 128 may comprise a set of catalogs, each catalog corresponding to a retailer 160 or manufacturer 130.

A catalog may comprise a set of category identifiers utilized by the retailer or manufacturer, where each category identifier may be associated with one or more product identifiers and each product identifier may be, in turn, associated with a brand name, a product name, or any number of other desired attributes. A catalog may, for example, comprise one or more files of eXtensible Markup Language (XML). These catalogs 128 may be received from retailer 160 or manufacturer 130, for example over network 170, at a regular or semi-regular basis. For example, catalogs may be received nightly from retailer 160 or manufacturer 130. It will be apparent that each retailer or manufacturer may provide its catalogs at different times, according to different time periods or schedules, irregularly, etc.

Catalogs 128 may also comprise one or more catalogs generated from catalogs received from retailers 160 or manufacturers 130. For example, in one embodiment a global catalog associated with each manufacturer 130 may be created by consolidating portions associated with that manufacturer 130 from each catalog received from retailers 160 with any catalogs received from that manufacturer 130. A global catalog may, for example, comprise a set of global categories and associated global products identifiers where product identifiers and category identifiers used by the retailers for corresponding categories and products may be associated with these global identifiers.

In one embodiment, a global identifier may be associated with product information from each of a set of matched products consolidated from each of the retailer or manufacturer catalogs. For example, a global identifier for a product may be associated with a set of product identifiers that are used for the product by manufacturers 130 or retailers 160. As a product is added to the global catalog or a product's information is updated, the name of the category from each retailer may be associated with the global identifier for the product. A product can be associated with multiple categories. An interface may be is provided for administrators to add, combine and rename categories. For example, a product could be in the "LCD Monitors" category in one retailer and "19 inch Monitors" for another retailer. This product would get added under both categories in the global catalog. A user, could, if desired choose to consolidate these two categories into, for example, a "Monitors" category.

Content distribution system 120 may also include a content distribution application 150 which comprises interface module 152, moderation module 154, a matching module 156 an event handler module 178 and an incorporation module 158. Moderation module 154 may moderate (for example, filter or otherwise select), or allow to be moderated, content which is, or is not to be, excluded or included, while matching module 156 may serve to match received user generated content with a particular product or category. In one embodiment, this matching process may be accomplished using catalogs 128.

Incorporation module 158 may be configured to incorporate a tool for the generation of content into a manufacturer's portal, or a retailer's or manufacturer's site. Furthermore, incorporation module 158 may be used to incorporate user generated content into a retailer's site 162, or other site, for display to a user. In particular, a user may generate content regarding a product or category at manufacturer's site 132 or retailer's site 162 (or another site) using a content generation tool (for example, a GUI, webpage, widget, etc.) presented on the site. This tool may be implemented or developed by operators of content distribution system 120 and provided for use with the site to facilitate the generation of content by users, or the subsequent processing, distribution and incorporation of such content by content distribution system 120. These tools may be hosted by incorporation module 158 of content distribution system 120. Thus, for example, on a page of retailer's site 162 a content generation tool may be included, such that the tool hosted at content distribution system 120 may be incorporated in the site 162 for use by a user at the site 162.

Such content generation tools can be distributed throughout a retailer's or manufacturer's (or other's) site. For example, these content generation tools may be included on a site's product pages as well as the category pages which help to organize the product page, or any other pages where it is desired to allow a user to generate content. Thus, such a content generation tool may be advantageously employed to allow content to be generated in the context of the product page or category page on which it was deployed. So, for example, if a content generation tool is deployed on a television product page, reviews associated with that television product may be received that are different than a review of a wool sweater generated using the content generation tool deployed on the product page for the wool sweater.

In any event, the content generated by the user with respect to a product or category may be received by content distribution system 120 and stored as user generated content 126 in association with one or more identifiers. One identifier may be a unique identifier assigned by content distribution system 120 such that each piece of received user generated content may be uniquely identified. Another identifier may be timestamp indicating the time at which such content was received at the content distribution system 120. Still another identifier that may be associated with received user generated content is a site of origin. This site of origin may identify the web site at which the user generated content was generated or the web site from which the user generated content was received. This site of origin may, for example, be a domain, subdomain or localization of a domain (e.g. orbitz.com may be considered a different site of origin than oribitz.co.uk or orbits.es).

Other identifiers may be utilized to associate the content with one or more web pages (which may, for example, be associated with that product or category) or another entity such as a section of a web site, multiple web sites, a product, a category, a brand, etc. Such an identifier may serve to group a set of content (which may have been generated at multiple retailer's or manufacturer's web sites) together so that it may be displayed in one location (for example, on a product page, a category page, or particular section of a site, etc.). Accordingly, an identifier may represent an actual product in the traditional sense of the word, a category comprising a collection of products or categories, a brand, or simply a particular container, page, or section of a site, including the entire site, itself or multiple web sites, and serve to group a set of content.

The received content may be moderated by moderation module 154, to determine if such content should be utilized for display on a site, or may be edited for suitability. This moderation process may comprise different levels of moderation, including auto processing the user generated content to identify blacklisted users or trusted users; human moderation which may include manually classifying content or content recategorization; proofreading; or almost any other type of moderation desired. Note, however, that such moderation may or may not be employed in certain embodiments. For example, content from certain manufacturers may not undergo such a moderation process, or may undergo moderation at a different point.

In one embodiment, this moderation process may also comprise associating identifiers with the received user generated content as discussed. These identifiers associate this user generated content with a manufacturer, products, brand or categories of products offered for sale by retailer 160 or the manufacturer 130, a user attributes of the user who generated the content, product attributes, etc. Thus, for example, received user generated content may be associated with a product identifier associated with a particular product or a category identifier associated with a particular category and the content and the associated identifiers stored in data store 122.

At least a portion of these associations may be determined using matching module 156 which may compare data received in conjunction with the user generated content (for example, product data, category data, user data, etc.) with data in a catalog 128. Once it is decided that the user generated content is to be stored in data store 122 and allowed to be disseminated (for example, has been moderated), event handler 178 may take certain actions based on the user generated content or its associated data, such as emailing a user, sending alerts to a manufacturer that new content regarding one of its products has been received, etc. These events may be tailored to the type of content generated or other attributes of the content.

Accordingly, a user shopping at, for example, retailer's site 162 may access a web page or other portion of the site 162 corresponding to a particular product or category. User generated content 168 associated with that product or category may be displayed on a user's browser such that a user viewing a portion of the retailer's site associated with a particular product or category may have user generated content 168 associated with that product or category displayed to him. This user generated content, may, for example, have been originally generated at the retailer's site 162, through the manufacturer's site 132 or at another site. Thus, the display of this user generated content to the user while he is shopping, may, in turn, motivate the user to make a purchase through retailer's site 162.

Both the user generated content displayed on the web page and a content generation tool for the generation of new content may be provided in conjunction with one another. Specifically, in one embodiment, the content from content distribution system 120 or a content generation tool may be incorporated into a portion of the web page of retailer's site 162 using an element such as an iframe or div tag, another type of HTML element or tag, or another type of mechanism altogether, and may be accessed through a variety of elements, such as a tab or link displayed on the web site or the like.

More particularly, in one embodiment, an inclusion module 164 (such as JavaScript or other type of computer instructions) may be included at the retailer's site 162 or associated with a particular web page of the retailer's site. This content distributor inclusion module 164 works in conjunction with incorporation module 158 of content distribution system 120 by making calls back to the incorporation module 158 on content distribution system 120 to incorporate the desired content for that page along with a content generation tool.

More particularly, in one embodiment, when a web page 166 from retailer's site 162 is loaded at a user computer 110 the HTML for the page may load, including the element used to incorporate content from the content provider system 120. A content distributor software module 164 (which may have been provided by operators of the content distribution system 120 or implemented by operators of the retailer's site 162) may also load at this time to access incorporation module 158 to obtain user generated content (e.g. reviews, stories, etc., as discussed above) for inclusion in the web page 166 in conjunction with the element such that the obtained user generated content can be displayed in the web page 166 of the retailer's site.

In one embodiment, the content distributor software module 164 associated with content distribution system 120 resident on retailer's site 162 may be executed when the web page 166 is loaded. This content distributor software module 164 may send data associated with the web page 166 such as the product data, user data, display codes, etc. to incorporation module 158. Incorporation module 158 may utilize this data to determine a set of user generated content 168 from the stored user generated content 126 to return, format this user generated content 168 accordingly and return this user generated content to the calling content distributor software module 164.

The content distributor software module 164 executing on the browser at the user's computer 110 receives content from the incorporation module 158 and incorporates the content into the element on the web page 166 configured to display the content. Moreover, the ability to generate additional content may be offered, where the type of content generation opportunity offered may correspond to the type of incorporated content. For example, the opportunity to generate an additional review may be presented along with reviews that have been incorporated in the web page 166 at the retailer's site 162.

As can be seen then, by calling content distribution system 120 to obtain user generated content 168 for display in a web page when that web page is rendered by the browser at the user's computer 110 a number of advantages can be obtained. One substantially important advantage is that the content retrieved from the content distribution system 120 by the content distributor software module 164 is fresh. In other words, content recently received by the content distribution system 120 may be included on a web page 166 without alteration to the web page 166 itself. Part and parcel with this, the format or appearance of such user generated content may be altered without alteration to the code that comprises the web page itself.

However, because the content to be displayed on the web page 166 of the retailer's site 162 is actually provided by content distribution system 120 using a content distributor software module 164, such content may be not be indexed by a search engine indexer accessing such a web page because, for example, the content distributor software module 164 may not be executed by the search engine indexer or the search engine indexer may be configured not to index content incorporated using such software modules. Thus, it may be desired to expose such content to search engine indexers in conjunction with such a web page while still retaining the advantage offered by embodiments of the systems and methods presented herein.

In one embodiment, this may be accomplished by building a mirror site for each retailer's site 162. Thus each retailer 160 would have a web site 162 with commerce enabled pages for each product/category (e.g. web pages through which purchases could be made) and a mirror site in which the user generated content is incorporated into web pages in such a way that they are exposed to search engine indexers (for example, including the user generated content in the HTML which comprises the web page itself). For example, each commerce enabled page for a product/category may have a corresponding page in the mirror site in which all or a substantial portion of user generated content associated with that product/category is incorporated in the code comprising that web page such a manner that it is exposed to the search engine indexer.

This embodiment may have certain less than ideal characteristics. First and foremost, in this embodiment the web pages that are indexed may be the web pages of the mirror site. Thus, it may be these mirror pages (and not the commerce enabled pages) that are exposed to the user when the user searches using the search engine. Consequently, a web page returned using a search engine may be the page of the mirror site and a user may access the web page of the mirror site as opposed to the commerce enabled page associated with product/category.

While the two web pages (mirror web page and corresponding commerce enabled page) may be linked, this one extra link may cause a significant reduction in the number of users who actually land on the commerce enabled page or make purchases through the commerce enabled page. Additionally, as most search engine algorithms give some amount of weight to the freshness of content, as user generated content is changing often it is desired that the user generated content be exposed to search engine indexers though the commerce enabled page itself, to provide a mechanism for increasing the freshness rating of the commerce enabled page.

Furthermore, most search engine indexing algorithms utilize some form of weighting based on content richness (e.g. keyword density). For a product page, an operator of a site may desire to target a few keywords (product name, brand, etc.) such that a web page will show up in a search for those few targeted keywords. In many cases, the pages of a mirror site will compete against their corresponding commerce enabled pages with respect to the search engine indexer (e.g. both pages may be indexed according to the target words and links to both these web pages may be presented to a user as a result of a search comprising one or more target keyword).

Figure 2:
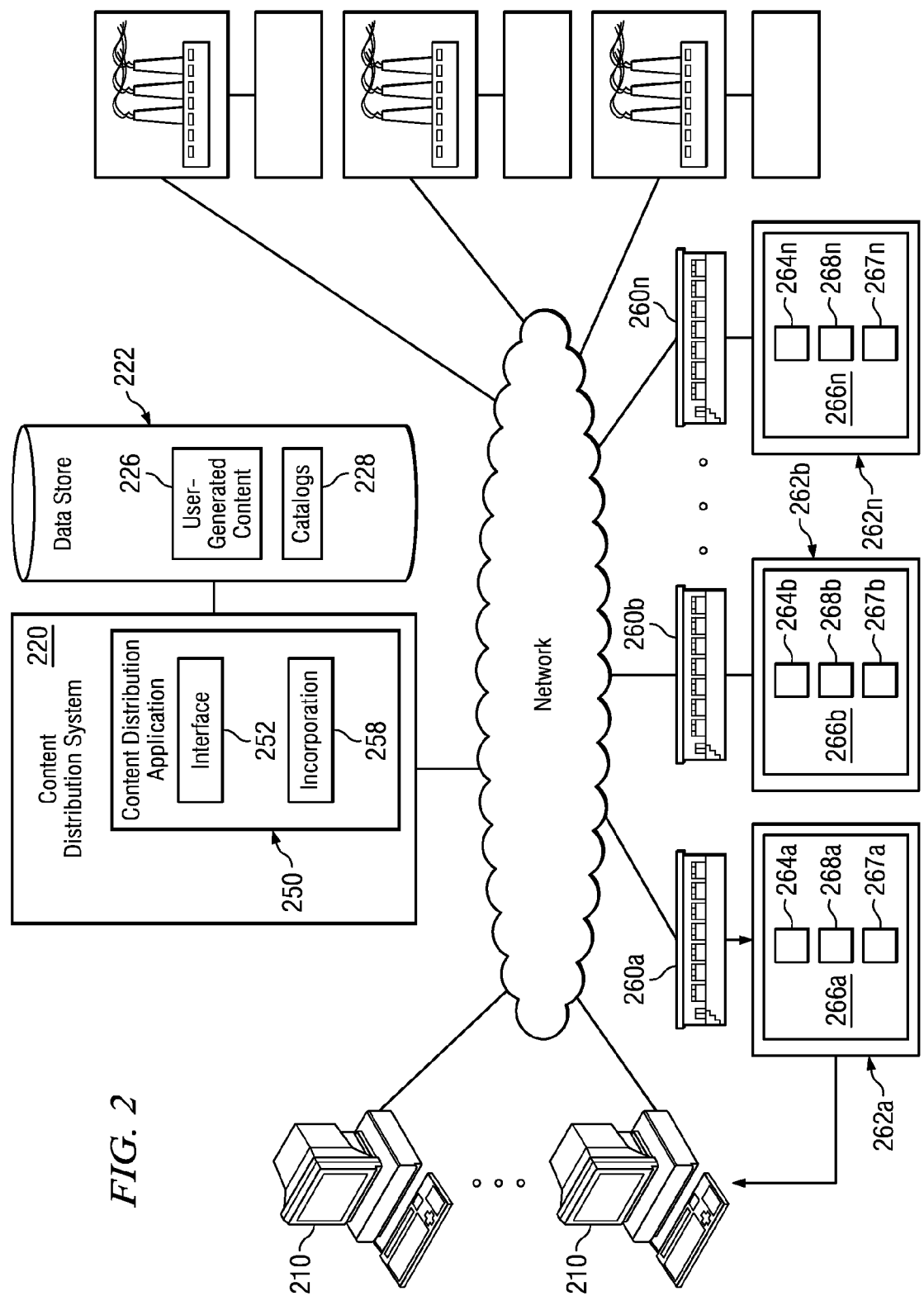
FIG. 2 is a block diagram of one embodiment of an architecture in which a content distribution system may be utilized.

Accordingly, embodiments of other methods for the exposure of user generated content to a search engine indexer in conjunction with a commerce enable page have been developed. Turning to FIG. 2, one embodiment of one embodiment of a content distribution topology including one embodiment of a content distribution system is depicted.

In one embodiment, user generated content from the content distribution system 220 may be incorporated into the commerce enabled (or other types of) web pages of a web site using a container in the web page as described above. This container may be for example, defined by a <div> tag. More specifically, as discussed above, when web page 266 from a retailer's site 262 is rendered by a browser at a user's computer 210 a content distributor software module 264 may be executed which sends a request to content distribution system 220 for user generated content to include in the web page 266. The user generated content 268 is returned by the content distribution system 220 and displayed in the container by the content distributor software module 264.

In addition, to ensure user generated content is exposed to a search engine indexer user generated content 267 associated with that web page 266 may be incorporated into the source code that comprises the web page. In other words, when the web page is created by the operators of the retailer's site 262, user generated content 267 associated with the web page (e.g. user generated content for the product, category, brand, etc. associated with the web page) may be included within the <div> tag comprising the container. In this manner, a search engine indexer may be able to index this user generated content in association with the web page 266 as it is included in the actual code comprising web page.

Furthermore, if the content distributor software module 264 is able to execute, a request to the content distribution system 220 may still be sent and the user generated content 268 returned from the content distribution system 220 may be displayed instead of the user generated content 267 incorporated into the code of the web page 266 when the web page 266 loads on a user's computer 210. As can be seen, embodiments such as these may provide the benefit of allowing user generated content 267 to be indexed by search engine indexers while still allowing the freshest user generated content 268 to be presented to a user in conjunction with a user's access to that web page. As an added benefit, if for some reason JavaScript or code execution is turned off in the user's browser the user generated content 267 incorporated in the code of the web page 266 may still be displayed to the user when the web page 266 is rendered.

It will be noted that other embodiments may employ similar techniques. For example the content distributor software module 264 may be incorporated into a web page using a <script> tag or other mechanism. Here, a <noscript> tag (e.g. and matching </noscript> tag to make a <noscript> block) may be included in the web page. User generated content may be incorporated into the code of the web page within this <noscript> block.

To illustrate one embodiment in more detail: at some time interval a file comprising appropriate user generated content 267 may be sent from content distribution system 120 to the computing devices providing retailer's site 262. This type of content distribution may include, for example, those methods of content distribution that employ server-side transfer methods and transfer content independently or in aggregate form such as in zipped files, where this transfer may either be done real-time, for each server request (e.g. from servers providing the retailer's site 262), or may be batched on a schedule for example, hourly or daily. This type of content distribution may utilize a collection of methods or script instead of, or in addition to, any HTML markup that may be provided either together or separately via the same or different content distribution methods.

For example, the file provided from content distribution system 220 may comprise a zip file comprising compressed appropriate user generated content indexed by one or more catalog identifiers (as discussed earlier) associated with the retailer 260 to which the file is being provided such that user generated content associated with a product or category may be identified using an identifier for the product or category utilized by the retailer 260. In one embodiment, incorporation module may obtain a catalog 228 associated with the retailer 260 and determine a set of user generated content 226 associated with the identifiers of that retailer's 260 catalog. The user generated content 226 associated with a particular identifier can be formed as one or more .htm files and stored using a pathname that is associated with the identifier. The set of files associated with each of the identifiers can then be zipped or otherwise compressed such that when that file is decompressed the resulting file structure comprises each of the .htm files stored with a pathname associated with that identifier.

Operators of retailer's site 262 may receive such a file and decompress the file. The operators of the retailer's site 226 can then use a script to locate a web page of the retailer's site 262, determine the identifier of the product or category associated with the web page, obtain the user generated content from the zip file associated with that identifier and integrate that user generated content into that web page within the <div> block (e.g. <div> tag and corresponding </div> tag) used in conjunction with content distributor software module 264, for example, by modifying the existing web page or generating a replacement web page. When a new file comprising user generated content is received from content distribution system 220 this process may be repeated, such that the web pages 266 of the retailer's site 262 may be modified or recreated whenever a file is received. By continually modifying or recreating these web pages the user generated content exposed to the search engine indexer in conjunction with the web page may be kept relatively fresh.

Accordingly, when a web page 266 whose source comprises user generated content is loaded at a user's computer, the user generated content of the web page included in the <div> block of the web page may be loaded or pre-rendered. However, in conjunction with the load of the web page (e.g. the <div> block of the web page) the content distributor software module 264 is also executed. When executed the content distributor software module 264 may hide the display of user generated content 267 included in the <div> block of the web page (permanently or for a certain amount of time) and send a request to the content distribution system 220 for user generated content. In response to this request, the content distribution system 220 may return user generated content 268 to the user's computer 210 which is loading the web page 266. The content distributor software module 264 may receive the user generated content 268 and overwrite user generated content 267 included in the <div> tag with the received user generated content 268 such that what gets displayed to the user viewing the web page is the user generated content 268 returned from the content distribution system 120.

In certain embodiments, the request sent from the user's computer 210 by content distributor software module 264 may comprise identifiers associated with the user generated content 267 incorporated in the <div> block of the web page 266. Specifically, each portion of user generated content 267 (e.g. an individual review, question or answer, story, etc.) may have an identifier assigned to it by content distribution system 220 when it is received by content distribution system 220. These identifiers may be associated with the portions of user generated content 267 incorporated into the <div> block of the web page 266. When this web page 266 is loaded the content distributor software module 264 may obtain the identifiers of the portions of user generated content 267 incorporated into the <div> block of the web page 266 and send these identifiers to the content distribution system 220 along with the request for user generated content identifying the web page for which the user generated content is requested.

When the content distribution system 220 (for example, the incorporation module 258) receives such a request a set of user generated content 226 associated with the identified web page may be determined and a number of actions may be taken. In one embodiment, the content distribution system 220 may attempt to locate appropriate user generated content which is newer (has been received more recently than) the user generated content 267 incorporated in the <div> block of the web page 266 using the identifiers of the incorporated content provided in association with the request.

If newer user generated content 226 is located, the content distribution system 220 may obtain this new user generated content and may deliver this new user generated content (and possibly other user generated content, including portions of user generated content that may or may not be associated with the identifiers provided in association with the request) to the content distributor software module 264 for inclusion in the web page 266. Thus, this delivered user generated content 268 overwrites the user generated content 267 included in the code of the web page 266 and is incorporated into the web page 266 displayed at the user's computer 210. In this manner, user generated content 267 may be included in the web page in the <div> block and exposed to certain search engine indexers in a more optimal manner while the freshest user-generated content 268 may still be exposed to the user viewing the web page.

Alternatively, if newer user generated content cannot be located based on these identifiers the content distribution system 220 may send back identical user generated content to what was included in the <div> block of the web page 266 or may take no action such that the content included in the <div> tag may be rendered and incorporated into the web page displayed at the user's computer 110 (e.g. after the time period for which content distributor software module 264 hides user generated content 267).

In one embodiment, there may be a parameter in the request sent by content distributor software module 264 that indicates that the content distribution system 220 is to return user generated content identical to the user generated content 267 included in the <div> block. This parameter may be set by operators of retail site 262 to ensure that any changes that they make (e.g. to a template associated with web page or the content included in the <div> block) may effectuated in the actual web page as displayed.

It may be helpful to an understanding of certain embodiments to illustrate such embodiment in more detail. Accordingly, attention is first directed to FIGS. 3A and 3B which depict, respectively, a flow diagram and a block diagram of one embodiment for providing user generated content to a retailer for inclusion in the source code of that retailer's web pages. At step 302 content generated by a user at a web site (e.g. the retailer's web site, a manufacturer's web site, etc.) may be received at a content distribution system.

The user generated content may be associated with one or more identifiers at step 304 and stored at the content distribution system. The identifiers associated with the content may be the identifier of a product or category received when the content was generated. Identifiers may also be assigned by the content distribution system when user generated content is received. Such identifiers may serve to uniquely identify each piece of user generated content (e.g. each review, question or answer, story, etc.) stored by the content distribution system. Other identifiers include timestamps and site of origin as discussed above.

Additionally, identifiers may be one or more identifiers provided by the operators of a retailer web site in a product or category catalog provided by the retailer. The identifiers in a catalog provided by the retailer may reflect the products or categories offered by that retailer and may similarly reflect the organization of the pages of that retailer's site such that the identifiers in a may be associated with a page of that retailer's site. For example, identifiers may By associating an identifier from a retailer's catalog with a piece of user generated content it can be determined that the piece of user generated content is associated with a product or category and is appropriate for display on the associated page of the retailer's site.

At some time interval then (e.g. hourly, daily, weekly, bi-weekly, etc.) a retailer file of user generated content for a retailer is formed by content distribution system at step 306. The retailer file may be organized by type of user generated content (where there may be a separate file for each type of user generated content) and by the identifiers associated with pages of the retailer's site.

This process may entail determining an appropriate set of user generated content for each page of the retailer's web site on which it is desired to present user generated content. These pages may correspond to the identifiers provided by the retailer in the catalog provided to the content distribution system. Thus, for each (i.e. all or some subset) of the identifiers in the retailer's catalog a set of appropriate user generated content may be determined. A file comprising the user generated content for a particular page of the retailer's site, which may comprise one or more .htm files, may then be formed. The retailer file can then be formed from each of the page files.

Each of the page files for a retailer may be stored in the retailer file using a pathname that comprises the associated identifier of the page with which the file is associated. For example, if "HotelA" is an identifier for a product sold by a retailer and a corresponding page, the pathname for the page file associated with that identifier and page might be: reviews/HotelA/Reviews.htm. The file for a retailer may thus be the set of page files for each of the identifiers, stored at a corresponding pathname. The retailer file can be compressed to reduce the amount of data or time it takes to communicate this file.

In one embodiment, the determination of the appropriate user generated content for a page of the retailer's site to include in the associated file for that page may employ the same methodology as is used to determine appropriate user generated content to return in response to a request from a content distributor incorporation module executing at a user's browser in conjunction with the rendering of that page. The determined set of user generated content can thus be thought of as a snapshot of user generated content which would be provided by the content distribution system for inclusion the associated page at the moment in time when such content is determined.

More specifically, a set of stored user generated content associated with the identifier may be determined. A set of filters can then be applied to the set of stored user generated content to refine this set of content. These filters may for example, remove or select content for inclusion in the set of content based on time of generation, site of origin, or other criteria. For example, the six to ten most recently generated pieces of user generated content may be selected for inclusion in the set of content for a page and all other user generated content removed from the set of content.

One particular filter that may be applied in the determination of user generated content for a page may be a syndication delay filter. Such a syndication delay filter may serve to provide user generated content only to the site of origin for a particular time period. The use of a syndication delay may be desired because of the manner in which some search engine indexers operate. Many such search engine operators understand that user generated content may be generated at one site and displayed at one or more other sites (this is sometimes referred to as syndication of content). The algorithms used by these search engines to index web pages thus attempt give more weight to the content in conjunction with the site where such content was originally generated. Thus, for example, if content was generated by a user through a page offered by bestbuy.com and syndicated to a variety of other sites, certain search engine algorithms may give greater weight in an algorithmic analysis of the content in association with its inclusion on web pages in the bestbuy.com domain as opposed to any of the web pages in domains of the other sites. Being the site of origin for content may increase the ranking of that site by these types of search engines which may, in turn, result in the web site (or a web page within that web site) being exposed as a result of a search using that search engine.

Accordingly, in many cases, operators of web sites where content was originally generated may desire for this to be taken into account when web pages of their site are indexed or ranked. In some cases, however, it may be difficult for search engines or search engine indexers to determine the site of origin for various content, including user generated content, as such content may be syndicated to many web sites relatively quickly after it is generated and search engine indexers may not process web sites in a particular order. A syndication delay filter can be employed to allow the distribution and syndication of user generated content while improving the ability of search engines or search engine indexers to more easily determine the site of origin for such content.

A syndication filter may impose a delay between the reception of user generated content from the site of origin and the syndication of this content to web sites other than the site of origin. Each potential web site of origin can designate a syndication delay time period which may for example comprise a time period of 7 to 10 days. User generated content may not be syndicated to any site other than the site of origin for the syndication delay time period associated with the site of origin.

In other embodiments, a syndication delay time period may be designated by a site other than a site of origin. Here, user generated content may not be syndicated to that site if it was generated within the syndication delay time period associated with that site. Allowing receiving sites to designate a syndication delay may be useful in situations where multiple sites are owned and managed by a single group. For example, orbitz.com owns five sites, which are all managed by one central group of people.

Figure 5:
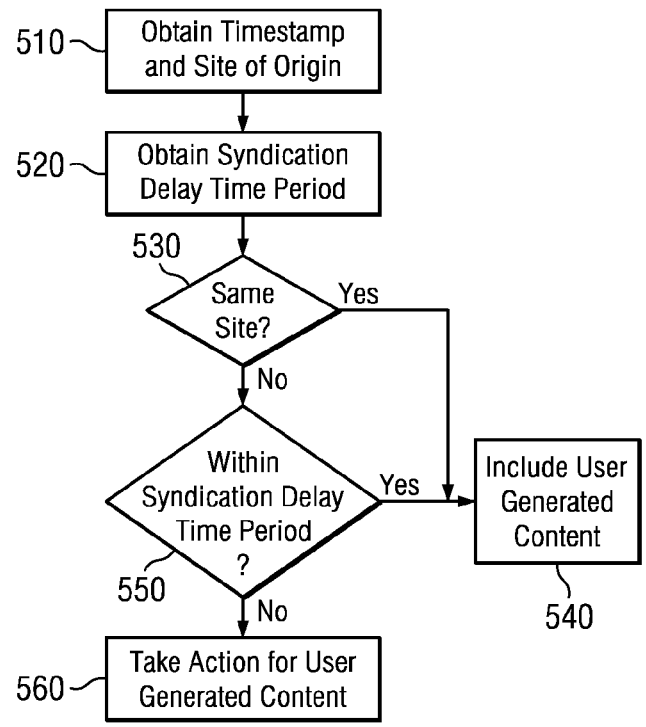
FIG. 5 is flow diagram of one embodiment of a method for implementing a syndication delay.

The application of one embodiment of a syndication delay filter to a piece of user generated content may be illustrated with reference to the flow diagram of FIG. 5. When the syndication filter is applied to a piece of user generated content determined for a particular web page the site of origin and timestamp associated with each piece of user generated content may be obtained at step 510. If the site of origin for the user generated content is the same as the site associated with the web page for which the set of user generated content is being determined (for example, the retailer's web site that comprises the page) the user generated content can be included in the set of user generated content determined for the page at step 530.

Alternatively, if the site of origin for the piece of user generated content is not the same as the site of the web page it can be determined at step 550 if the content was generated within the syndication delay time period. In particular, using the current time it can be determined if the user generated content was received from the site of origin within the syndication delay time period associated with that site of origin (e.g. if an operator of a web site specified a 7 day syndication delay time period and the user generated content determined was generated at that web site it can be determined if the user generated content was generated within the last 7 days).

If the user generated content was not generated within the syndication delay time period (e.g. was generated greater than 7 days ago) it may be included in the set of user generated content determined for the page at step 530. If, however, the user generated content was generated within the syndication delay time period a variety of actions may be taken at step 560. For example, the user generated content may be removed from the set of content determined for that page. In some embodiments, in addition to the removal of such content, another piece of user generated content to be included in the set of user generated content may replace the user generated content in the set of content determined for the page, where this newly determined content falls outside the syndication delay time period, etc.

Returning now to FIG. 3A, the set of user generated determined after the application of any filters can then be included in the page file associated with the identifier. In one embodiment, in addition to the determined user generated content the content of such a file may include additional markup language or other code. Such additional markup language or other code may provide a particular format to the user generated content when it is rendered, may be additional code which it is desired to include to supplement the user generated content (e.g. to provide interactivity, page links, additional descriptions, etc.) code for hiding certain portions of the included user generated content when it is rendered by a browser, etc.

For example, it may be the case that a particular retailer would like content to be displayed with full formatting according to their site's format. In such cases the included user generated content may be fully "decorated" with HTML when it is included in the file for that retailer. For example, in these cases the included user generated content may be formatted similarly to what would be returned by content distribution system in response to a call from the content distributor incorporation module. Alternatively, other retailers may desire, or not care if, such included user generated content is formatted in the event it is displayed. In these cases, the selected content may be left undecorated, or a minimal amount of HTML may be included with the selected content in the file for those retailers. The user generated content may also be formatted according to one or more schemas that may be effectively processed by search engine indexers. Examples of such schemas include for example, microformat, microdata, hReview, hReview-aggregate, RDFa, etc.

As discussed above, in many cases the file content included in a page file will be included by a retailer in the source code of the associated web page. However, when such a web page is rendered this file content may be overwritten with new content obtained from the content distribution system. Accordingly, then, to prevent the momentary display of the included file content before it is overwritten (sometimes referred to as flashing) or for other reasons, it may be desired to prevent the display of the file content included in the source code of the web page when the web page is rendered and before the included file content is overwritten with the content obtained from the content distribution system. In order to effectuate this, code (e.g. JavaScript, ActiveX, etc.) may be included in the .htm file that will serve to hide the file content that includes the selected user generated content for a time period.

The use of code to hide the file content may, however, effect the processing of such file content by search engine indexers. For example, it may be desired to include page links in the file content in addition to the selected user generated content, where these page links may be links to additional user generated content. Normally then, if the source code of a web page which included these types of page links was processed by a search engine indexer the user generated content associated with those page links would get indexed in conjunction that web page. However, if the search engine indexer detects that such page links are hidden (e.g. detects code that hides such page links) the user generated content associated with these page links may not be indexed by the search engine indexer.

Accordingly, when forming the file content for inclusion in the file it may be desired to format such file content such that if such file content were rendered by a browser some portions of the file content would be hidden while other portions of the file content would not be hidden. Portions of file content may be configured to be hidden or rendered based on a desire to have such file content indexed by a search engine indexer when included in the source code of a web page, or may be based on other criteria.

To hide certain portions of the file content while other portions are rendered, portions of the file content may be included in a corresponding <div> block of the file content. The code included in the file content which is configured to hide content may be configured to hide only those particular <div> blocks that include file content that it is desired to hide. Thus, <div> blocks that include code that it desired to have rendered will be rendered.

To continue with the above example, suppose that it is desired to hide the user generated content of the file content while leaving the page links in the file content exposed. Here, the file content may comprise two <div> blocks, one <div> block with an identifier of "reviews" and another <div> block with an identifier of "pagination". The selected user generated content may be included in the "reviews" <div> block while the page links may be included in the "pagination" <div> block. Code included in the file for a retailer may be configured to hide only the "reviews" <div> block when a web page including the file content is rendered thus leaving the page links in the "pagination" <div> block to be rendered. It will be noted here that the same methodology may be employed to hide or show any desired portion of the file content and that as search engine algorithm requirements change, it may be desired to render and display some content before it is overwritten, including, for example, pagination links, summary information, such as aggregate review data, reviews, questions, answers, other forms of user generated content, links to content author profiles, links to media or embedded media, such as photos or videos or other types of content.

Figure 3A:
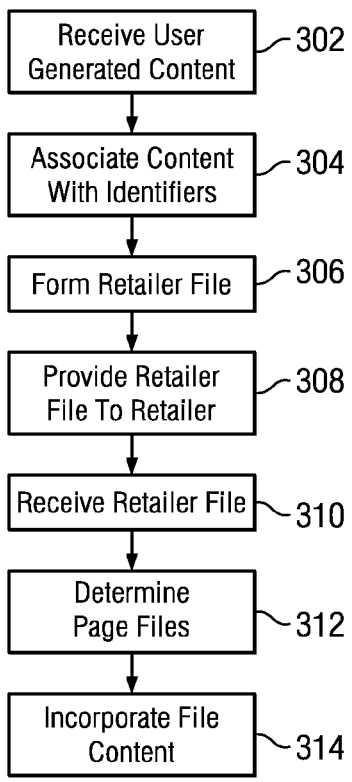
FIG. 3A is flow diagram of one embodiment of a method for utilizing content.

Referring still to FIG. 3A, once the retailer file is formed it may be provided to the retailer at step 308. The retailer may receive the retailer file from the content distribution system at step 310. The retailer can then decompress the file if needed and parse or otherwise process the file at step 312 to determine the page file(s) in the retailer file associated with each of one or more of their web pages. As noted above, each page file in the retailer file may be stored according to a path name that comprises an identifier associated with an associated web page of the retailer. Accordingly, by using an identifier of one of their web page the retailer may be able to locate the page file associated with that web page in the retailer file.

The retailer file can then incorporate the file content of the located page file into the source code of the associated web page at step 314. For example, the web page may be regenerated with the file content included or the file content may be inserted into an existing web page. In one embodiment, the file content may be incorporated within the associated web page in a container defined using a <div> block. The <div> block may have a particular identifier (e.g., <div id="bvrrcontainer">) where that identifier may be unique within that web page (e.g. no other container or tags of the web page may be assigned that identifier) such that a content distributor incorporation module may be able to identify the container that includes the file content using this identifier and overwrite at least a portion of the file content included in that container (as discussed above).

It will be noted here that while providing such file content to the retailer in a retailer file may be desired by various retailers, other retailers may desire that such file content be provided via other methods. Thus, it should be understood that such file content may be provided to a retailer via a variety of channels such as an eXtensible Markup Language (XML) data feed, a storage medium such as a DVD, etc., and retailers may similarly use an appropriate method for the incorporation of this file content into their web pages, without loss of generality.

Figure 3B:
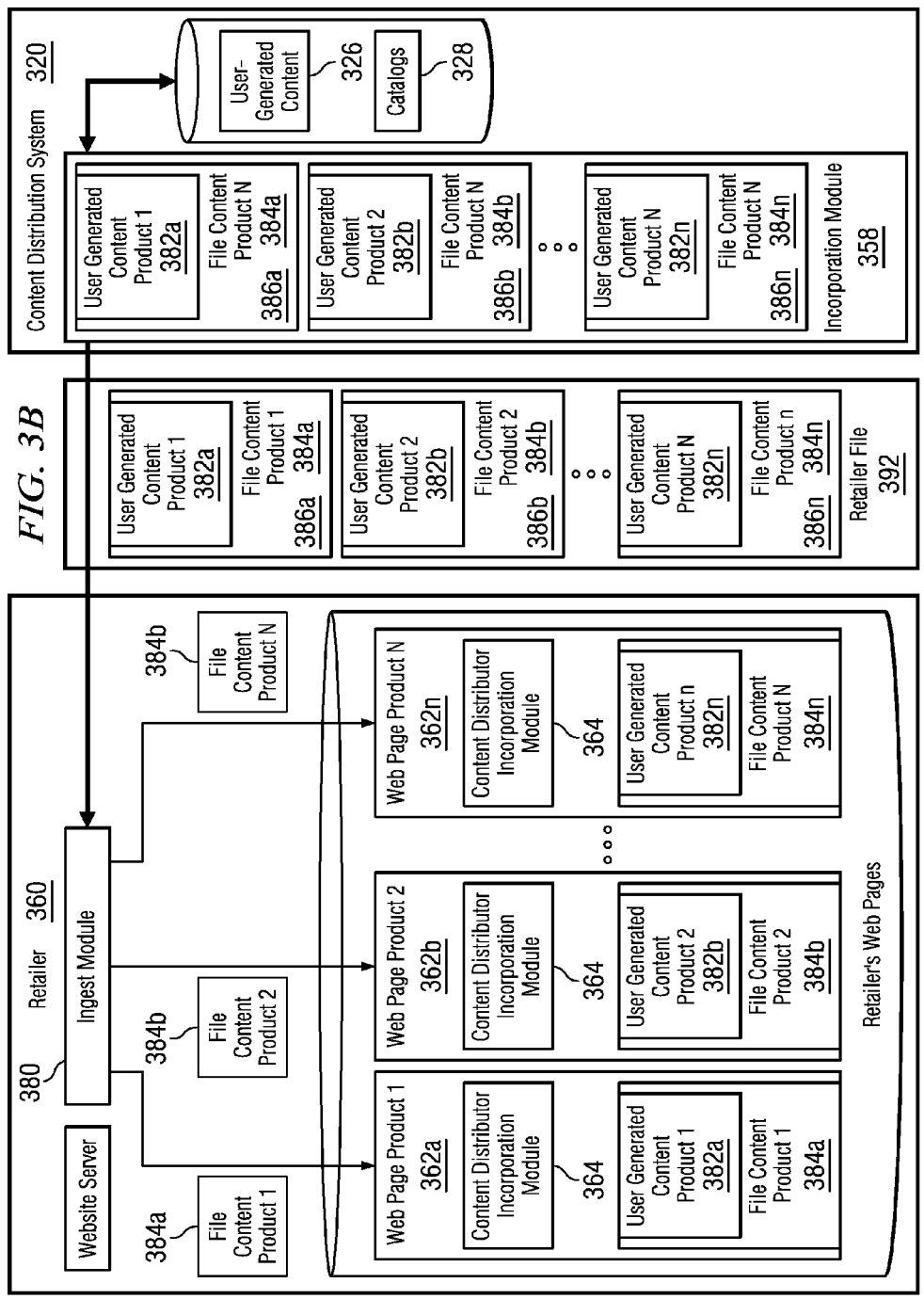
FIG. 3B is a block diagram of one embodiment of the inclusion of content.

Moving now to FIG. 3B, a graphical depiction of an example of one embodiment for providing user generated content to a retailer for inclusion in the source code of that retailer's web pages is depicted. As discussed above, at some interval incorporation module 358 of content distribution system 320 may create retailer file 392 for a particular retailer 360. To create the retailer file 392 incorporation module 358 may determine a set of identifiers associated with the retailer 360 using the catalog 328 associated with that retailer 360. Assume for purposes of this example that such identifiers are associated with products offered for sale by the retailer and corresponding web pages 362 provided through the web site of the retailer 360.

Using the identifier for each of the products, appropriate user generated content 382 from user generated content 326 may be determined. This user generated content 382 is part of the file content 384 included in the page file 386 for an identifier and associated web page. Each of these page files 386 is included in the retailer file 392 in association with that identifier and the retailer file 392 is then sent to the retailer 360 (e.g. one or more computing devices associated with the retailer).

The retailer 360 may receive the retailer file 392 and process the retailer file 392 using an ingest module 380. This ingest module 380 may be configured to process the retailer file 392 to determine the file content 384 associated with each of the one or more web pages 362. The ingest module 380 may be further configured to incorporate the appropriate file content 384, including the user generated content 382, into each of the respective web pages 362. Thus, the source code of each web page 362 may include the user generated content 382 and other file content 384 provided by the content distribution system 320 in the retailer file 392. Accordingly, this file content 384 (including the user generated content 382) will be indexed in association with the respective web page 362 when that web page 362 is indexed by a search engine indexer.

Furthermore, a content distributor incorporation module 364 may be included in the retailer's web page 362, where the content distributor incorporation module 364 may include code such as JavaScript that is configured to, when executed by a browser rendering the web page 362 at a user's computer device, contact the content distribution system 320 and request user generated content. Embodiments of such content distributor incorporation modules have been discussed in detail above and will additionally be discussed later herein.

With that in mind, attention is now directed to FIGS. 4A and 4B-4E which depict, respectively, a flow diagram and block diagrams of one embodiment for the accessing such a web page at a computer device. At step 410 a web page of the retailer's web site may be accessed. This web page may include both user generated content (or other file content) in the source code of the web page and the content distributor incorporation module. Such access may be from, for example, a user browsing a retailer's web or a search engine indexer as discussed above. This web page may be provided from the retailer (e.g. one or more computing devices that implement the web site of the retailer) to the accessing device (e.g. the user's browser at the user's computing device or the computing device executing the search engine indexer).

If code execution is not enabled at step 412 (for example, if the user has turned off the execution of JavaScript in his browser or the execution of such code is otherwise prevented or not attempted such as with a search engine indexer) the user generated content incorporated into the source code of the web page may be utilized at step 414. For example, if the web page is being accessed by a user at browser, the user generated content incorporated into the source code of the web page may be rendered by the user's browser and displayed to the user. If, however, the access to the web page is made by a search engine indexer the user generated content included in the source code of the web page will be processed by the search engine indexer such that it is indexed in conjunction with that web page.

Alternatively, if code execution is enabled at step 412 (which may be the case in the majority of accesses by users utilizing browsers) the content distributor incorporation module included in the web page may be executed at step 416. When the content distributor incorporation module is executed it may send a request for user generated content for the web page to the content distribution system at step 418. The content distribution system may determine appropriate user generated content based on the received request at step 420, format the user generated content appropriately (e.g. by including additional markup language to format the display of that content specifically for that retailer, adding interactive elements, adding additional content to the user generated content, adding links or other elements, etc.) and, at step 422, return this user generated content to the content distributor incorporation module executing on the browser (or other program) from which the request was received. It will be noted that in the determination of user generated content to return at step 420 one or more filters may be applied to the determined user generated content as discussed above with respect to FIG. 3A. In particular, in one embodiment, an embodiment of a syndication delay filter as discussed above with respect to FIG. 5 may be applied in the determination of appropriate user generated content at step 420.

When the user generated content is received by the content distributor incorporation module at step 424 the content distributor incorporation module may overwrite the user generated content included in the source code of the web page at step 426 such that the new user generated content received from the content distribution system is rendered by the browser and displayed to the user instead of the user generated content incorporated into the source code of the web page itself.

As discussed above, user generated content may be incorporated within the source code of the web page in a container defined using a <div> block with a particular identifier (e.g., <div id="bvrrcontainer">) where that identifier may be unique within that web page. Thus, to overwrite the user generated content included in the source code of the web page the content distributor incorporation module may be configured to overwrite everything within the container having that identifier with the user generated content received from the content distribution system.

It will be noted that there may be a period of time between when the web page is rendered by a browser and the time in which the content distributor incorporation module requests, receives and overwrites the user generated content included in the source of the web page with the newly received user generated content from the content distribution system. Thus, as all the source code of the web page may be rendered by the browser there may be a time interval in which the content included in the source code of the web page in the container with the identifier may be briefly displayed to the user before it is overwritten with the newly received content by the content distributor incorporation module.

To prevent such flashing of the included content, at least a portion of the rendered content of the container with the identifier may be hidden through the execution of a script or other code included in conjunction with the container (as discussed above). As this code may be executed when the web page is initially rendered it may prevent flashing of the content included in the source code of the web page during the time interval between initial rendering of the web page and the overwriting of this content with newly received content from the content distribution system. Such a script may serve to hide a portion, or all of, the rendered content included in the container, as discussed above.

Figure 4A:
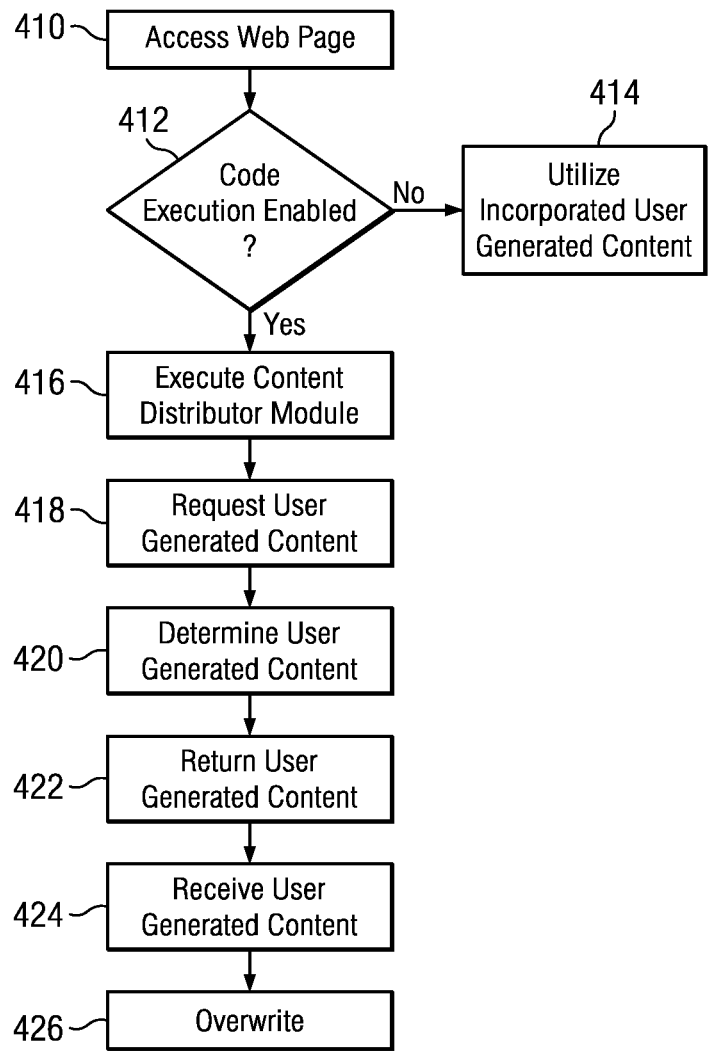
FIG. 4A is flow diagram of one embodiment of a method for utilizing content.
Figure 4B:
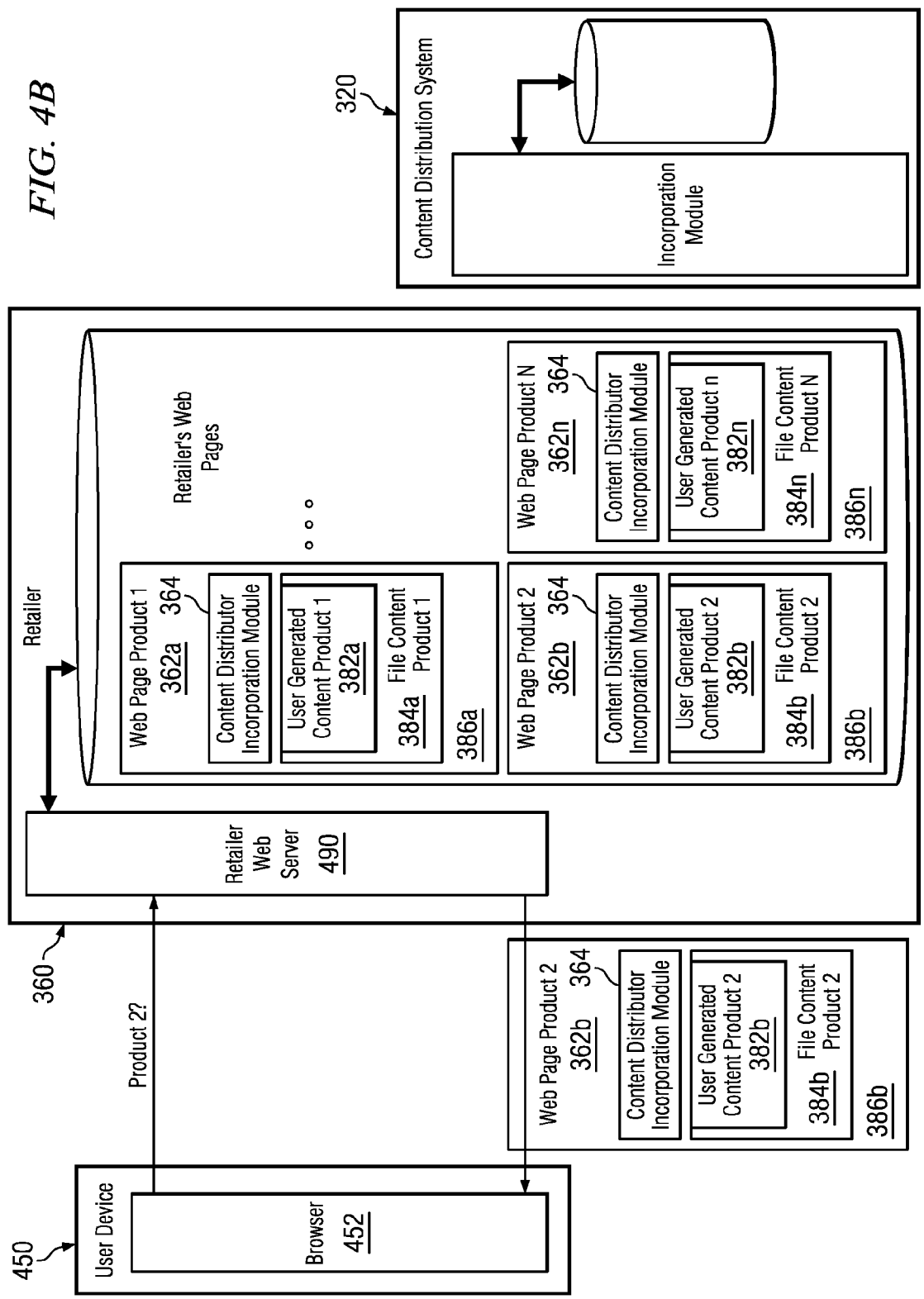
FIGS. 4B-4E are block diagrams of embodiment of the inclusion of content.

A graphical depiction of an embodiment of accessing a web page, such as those described above, at a computer device may be helpful. Referring initially to FIG. 4B, which continues with the above example depicted in FIG. 3B, a user at a user computing device 450 may utilize a browser 452 to request a web page associated with "product 2" from retailer 360. More specifically, the browser 452 may send a request to the retailer's web server 490 identifying the web page requested (for example, an HTTP GET or POST request or the like). The retailer web server 490 may obtain the requested web page 386*b* from the retailer's web pages and return the requested web page 386*b* associated with "product 2" to the browser 452 at the user computing device 450. The web page 386*b* associated with "product 2" comprises source code that includes the file content 384*b* associated with "product 2", including user generated content 382*b* associated with "product 2."

Figure 4C:
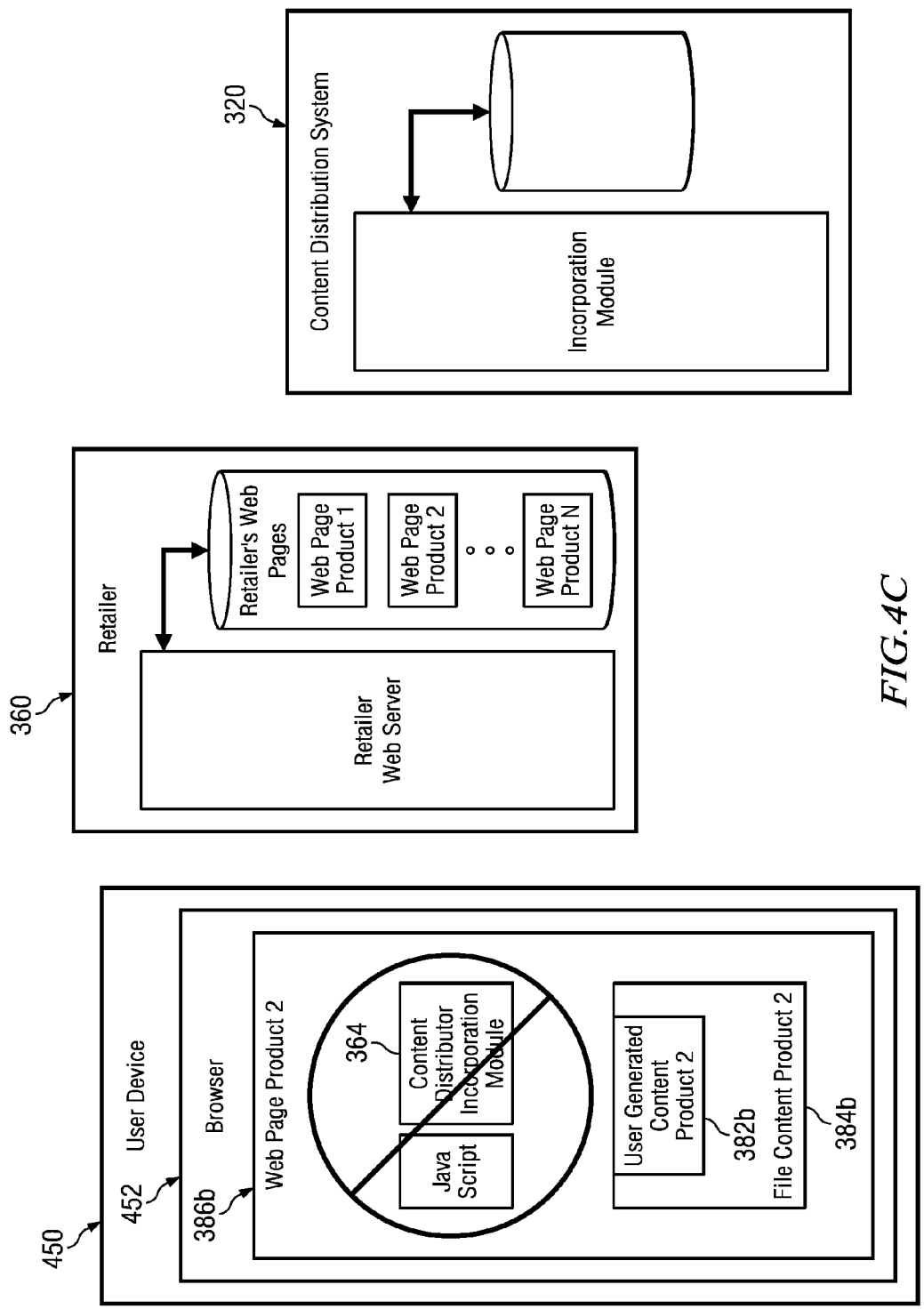

Assume for purposes of this example that the content distributor incorporation module 364 included with the web page 386*b* comprises JavaScript and that browser 452 at the user computing device 350 has JavaScript disabled for some reason. FIG. 4C graphically depicts the rendering of the example web page 386*b* in such a scenario. Here, as JavaScript may be disabled, content distributor software module 364 may not be executed. Additionally, any JavaScript code included in file content 384 may not be executed. Accordingly, file content 384*b* (including the user generated content 382*b* associated with "product 2") included in the source code of the web page 386*b* for "product 2" may be rendered and displayed to the user in conjunction with the rendering of the web page 386*b* for "product 2." FIG. 6A depicts an example of a rendered web page where file content included in the source code of the web page has been rendered.

Figure 4D:
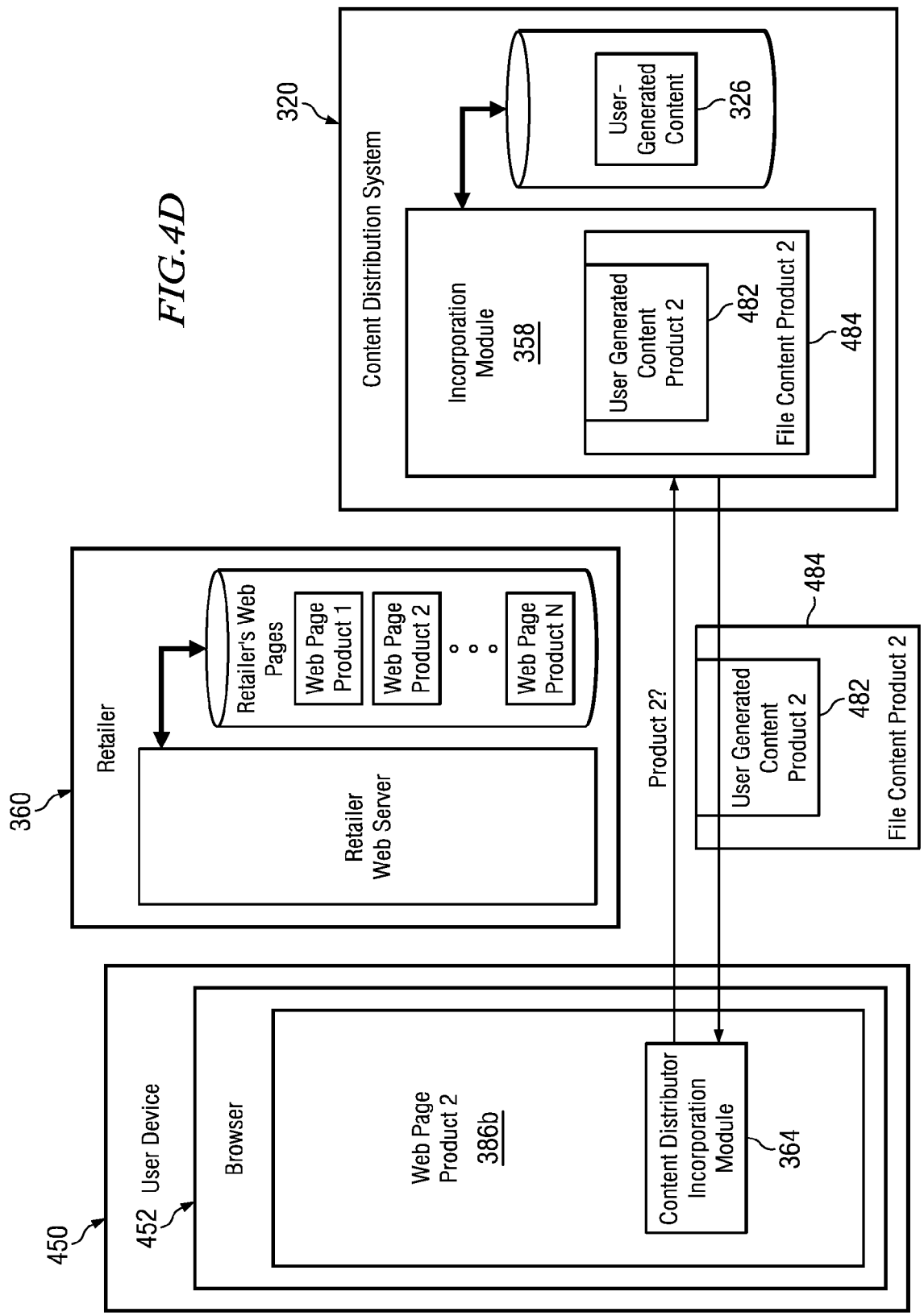
Figure 4E:
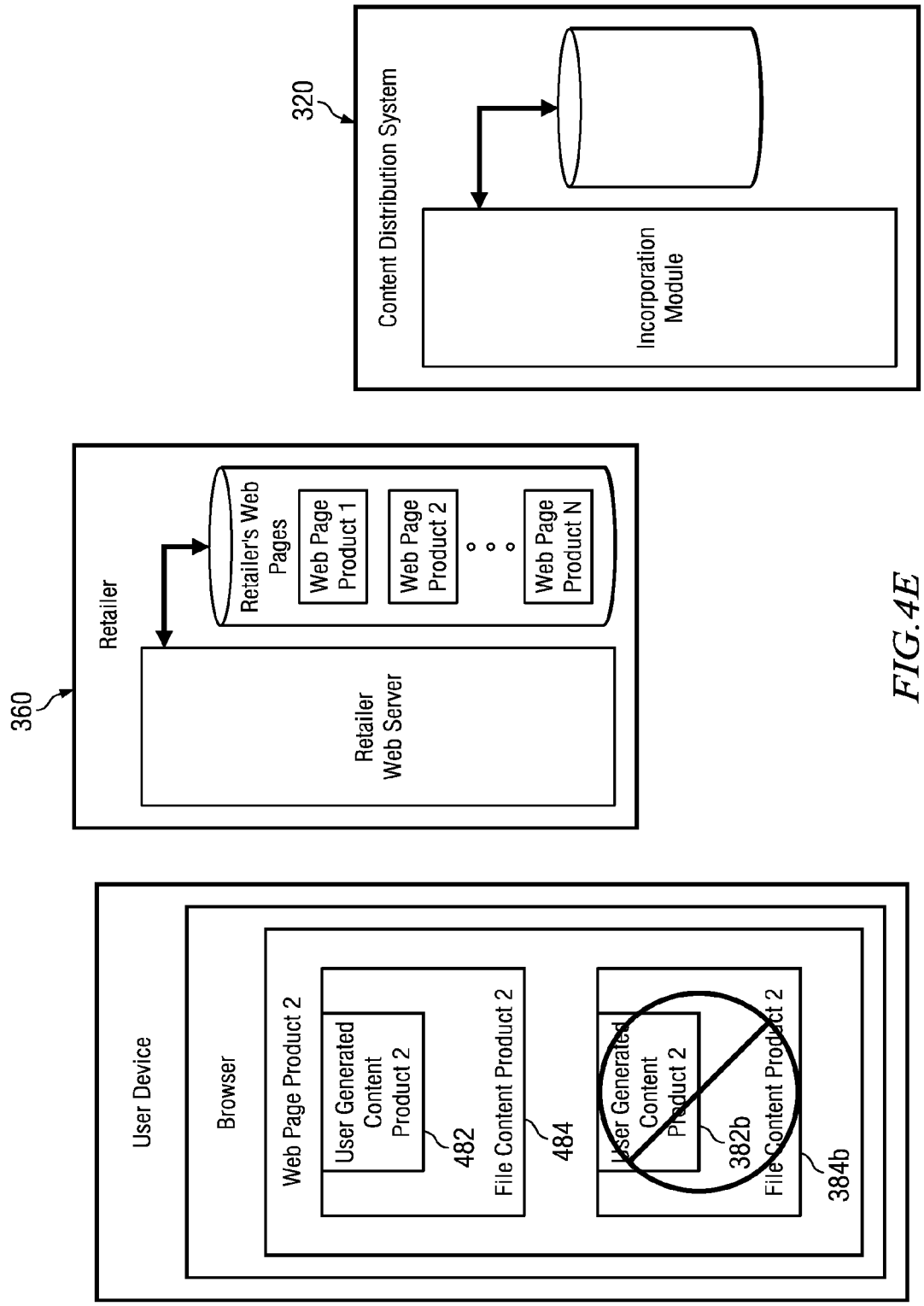

Referring back to FIG. 4B, assume again that that the content distributor incorporation module 364 included with the web page 386*b* comprises JavaScript but assume here that browser 452 at the user computing device 450 has JavaScript fully enabled. FIGS. 4D and 4E graphically depicts the rendering of the example web page 386*b* in such a scenario.

Looking first at FIG. 4D, when browser 452 receives and renders the web page 386*b* during the course of rendering the content distributor incorporation module 364 may be executed by the browser 452. When executed, the content distributor incorporation module 364 may send a request to content distribution system 320 where the request includes a set of data. Such data may, for example, include an identifier associated with "product 2" associated with web page 386*b* or an identifier associated with web page 386*b* itself (other examples and uses of various types of data that may be included in such a request are discussed elsewhere herein).

The request may be received at content distribution system 320 where incorporation module 358 may use at least a portion of the set of data included in the request to determine content 484 to return in response to the request. The content 484 includes a set of user generated content 482 from user generated content 326 that is associated with "product 2." This content 484 is then returned to the content distributor incorporation module 364 executing in association with the rendering of web page 386*b* at the browser 452.

Figure 6B:
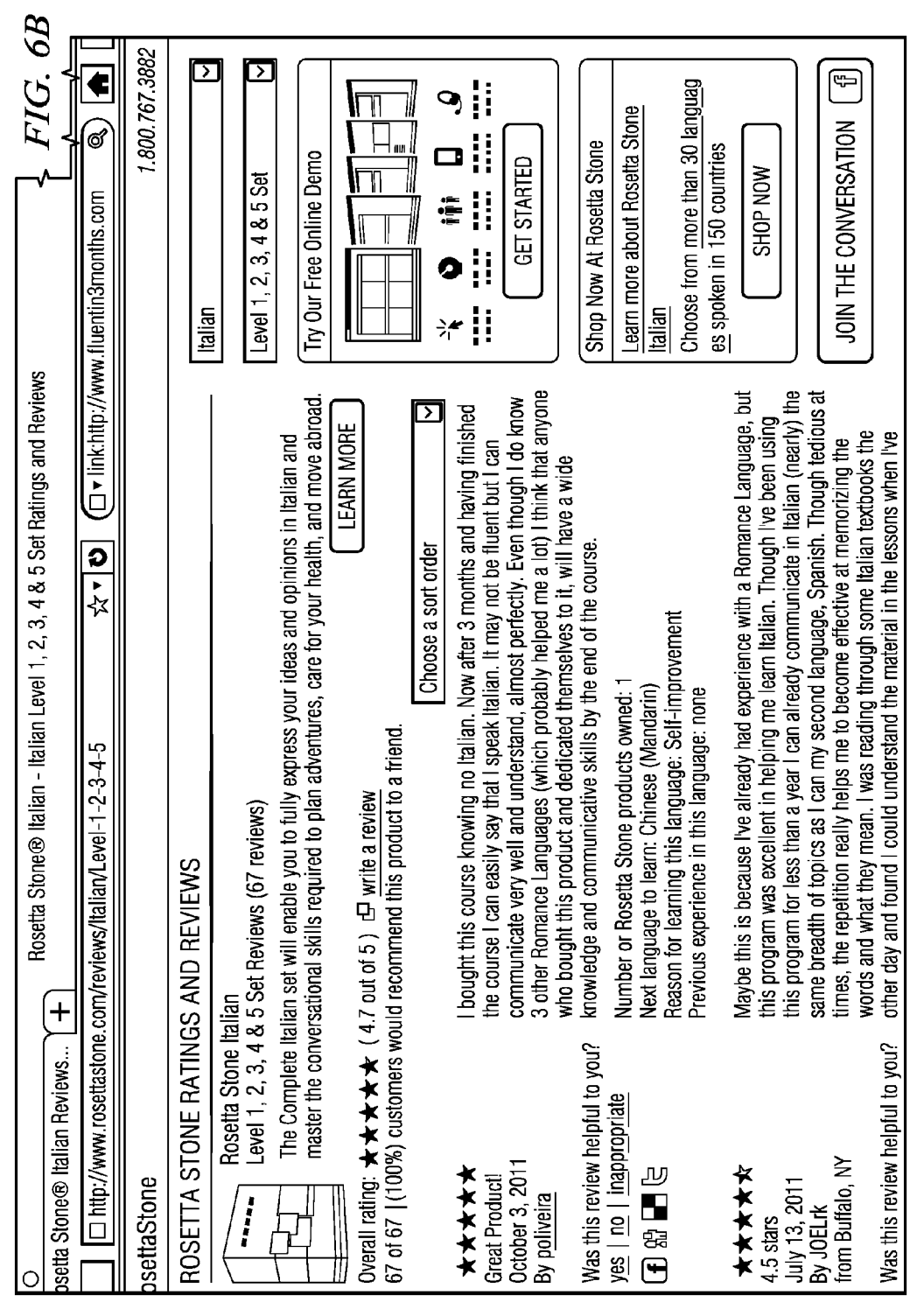

Moving on to FIG. 4E, when the content distributor incorporation module 364 receives content 484 from the content distribution system 320 it may overwrite the file content 384*b* included in the source code of the web page 386*b* with the newly received content 484. Thus, the newly received content 484, including the newly received user generated content 482 associated with "product 2", may be rendered and displayed to the user in conjunction with web page 386*b* instead of the user generated content 382*b* included in the source code of the web page 386*b*. FIG. 6B depicts an example of a rendered web page where content received from a content distribution system is rendered and displayed to the user in conjunction with the web page.

As can be seen then, using embodiments presented herein user generated content may be exposed to a search engine indexer in conjunction with a web page while still providing a mechanism for incorporating the freshest user generated content using an architecture that can provide for substantially real time interactivity between a user and aspects of user generated content through a web page. It should be noted here that while certain embodiments of have been described with respect to certain particular tags (e.g. <noscript>, <div>) other embodiments may be equally effectively implemented with other tags (e.g. <iframe>) or other mechanisms utilized with markup languages to execute certain code (e.g. scripts or the like) or incorporate content. Furthermore, although certain embodiments presented herein have been described with respect to retailers or manufacturers, etc. it should be noted that substantially similar embodiments may be employed equally effectively with respect to sites operated by other or different entities.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for distributing generated content, comprising receiving, by a content distribution system, first user generated content, wherein the first user generated content was generated at a first web page of a first web site, wherein the first user generated content is associated with an opinion of a product or a category, wherein the first user generated content is for incorporation into source code of the first web page of the first web site, and wherein the first user generated content is usable by one or more search engines to rank the first web page;
determining, by the content distribution system, a first time interval for a first portion of the first user generated content, wherein the first time interval exceeds a first syndication delay time period; and
in response to said determining the first time interval for the first portion of the first user generated content, providing, by the content distribution system, the first portion of the first user generated content for incorporation into source code of a second web page of a second web site associated with the product or category, wherein the second web site is different than the first web site, and wherein the first user generated content is usable by one or more search engines to rank the second web page.

2. The method of claim 1, further comprising:
determining a second time interval for a second portion of the first user generated content, wherein the second time interval is within a second syndication delay time period; and
in response to said determining the second time interval for the second portion of the first user generated content, providing second user generated content by the content distribution system for incorporation into the source code of the second web page instead of the second portion of the first user generated content.

3. The method of claim 2, wherein the first syndication delay time period is a same duration as the second syndication delay time period.

4. The method of claim 1, wherein said determining is performed in response to a request for content associated with the second web page from a browser rendering the second web page at a user computer.

5. The method of claim 4, wherein the first portion of the first user generated content is provided to the second web site in a file, and wherein the first portion of the first user generated content is associated with an identifier for the product, category or web page in the file.

6. The method of claim 5, wherein the request is associated with the identifier.

7. The method of claim 1, further comprising providing the first portion of the first user generated content for incorporation into the source code of the first web page of the first web site at which the first portion of the first user generated content was generated regardless of whether the first time interval for the first portion of the first user generated content exceeds the first syndication delay time period.

8. The method of claim 1, wherein the first portion of the first user generated content is provided to a browser at a user computer in response to a request received from the browser.

9. The method of claim 1, further comprising:
determining a second time interval for a second portion of the first user generated content, wherein the second time interval is within a second syndication delay time period; and
waiting to provide the second portion of the first user generated content for incorporation into the source code of the second web page of the second web site associated with the product or category until the second time interval for the second portion of the first user generated content exceeds the second syndication delay time period.

10. The method of claim 1, wherein ranking of the second web page by the one or more search engines includes determining a score for the second web page.

11. A content distribution system, comprising:
a processor; and
a non-transitory computer readable medium comprising instructions that are executable by the content distribution system, using the processor, to cause the content distribution system to perform operations comprising:
determining that a first time interval for a first portion of first user generated content exceeds a first syndication delay time period, wherein the first user generated content was generated at a first web page of a first web site, wherein the first user generated content is associated with an opinion of a product or a category, wherein the first user generated content is for incorporation into source code of the first web page of the first web site, and wherein the first user generated content is useable by one or more search engines to rank the first web page; and
in response to said determining that the first time interval for the first portion of the first user generated content exceeds the first syndication delay time period, providing the first portion of the first user generated content for incorporation into source code of a second web page of a second web site associated with the product or category, wherein the second web site is different than the first web site, and wherein the first user generated content is usable by one or more search engines to rank the second web page.

12. The system of claim 11, wherein the operations further comprise:
determining a second time interval for a second portion of the first user generated content, wherein the second time interval is within a second syndication delay time period;
in response to said determining the second time interval for the second portion of the first user generated content, providing second user generated content for incorporation into the source code of the second web page instead of the second portion of the first user generated content.

13. The system of claim 11, wherein said determining is performed in response to a request for content associated with the second web page from a browser rendering the second web page at a user computer.

14. The system of claim 11, wherein the operations further comprise:
providing the first portion of the first user generated content for incorporation into the source code of the first web page of the first web site at which the first portion of the first user generated content was generated regardless of whether the first time interval for the first portion of the first user generated content exceeds the first syndication delay time period.

15. The system of claim 11, wherein the first portion of the first user generated content is provided to a browser at a user computer in response to a request received from the browser.

16. The system of claim 11, wherein ranking of the second web page by the one or more search engines includes determining an order for presenting a plurality of web pages.

17. A non-transitory computer readable medium comprising instructions that are executable by a computing device to cause the computing device to perform operations comprising:
   determining that a first time interval for a first portion of first user generated content exceeds a first syndication delay time period, wherein the first user generated content was generated at a first web page of a first web site, wherein the first user generated content is associated with an opinion of a product or a category, wherein the first user generated content is for incorporation into source code of the first web page of the first web site, and wherein the first user generated content is useable by one or more search engines to rank the first web page; and
   in response to said determining the first time interval for the first portion of the first user generated content, providing the first portion of the first user generated content for incorporation into source code of a second web page of a second web site associated with the product or category, wherein the second web site is different than the first web site, and wherein the first user generated content is usable by one or more search engines to rank the second web page.

18. The non-transitory computer readable medium of claim 17, wherein the operations further comprise:
   determining a second time interval for a second portion of the first user generated content, wherein the second time interval is within a second syndication delay time period;
   in response to said determining the second time interval for the second portion of the first user generated content, providing second user generated content, instead of the second portion of the first user generated content, for incorporation into the source code of the second web page.

19. The non-transitory computer readable medium of claim 17, wherein said determining is performed in response to a request for content associated with the second web page from a browser rendering the second web page at a user computer.

20. The non-transitory computer readable medium of claim 17, wherein the operations further comprise providing the first portion of the first user generated content for incorporation into the source code of the first web page of the first web site at which the first user generated content was generated regardless of whether the first time interval for the first portion of the first user generated content exceeds the first syndication delay period.

21. The non-transitory computer readable medium of claim 17, wherein said ranking of the first and second web pages includes:
   determining a metric for the second web page; and
   determining, based at least in part on the metric for the second web page, an order for presenting a plurality of web pages.

\* \* \* \* \*